(12) United States Patent
Kiyoto et al.

(10) Patent No.: US 10,215,893 B2
(45) Date of Patent: Feb. 26, 2019

(54) INFRARED REFLECTIVE PATTERNED PRODUCT INCLUDING ORIENTED TABULAR METAL PARTICLES

(71) Applicant: FUJIFILM Corporation, Tokyo (JP)

(72) Inventors: Naoharu Kiyoto, Shizuoka (JP); Yuki Nakagawa, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/602,837

(22) Filed: May 23, 2017

(65) Prior Publication Data

US 2017/0261661 A1    Sep. 14, 2017

Related U.S. Application Data

(63) Continuation of application No. PCT/JP2015/080501, filed on Oct. 29, 2015.

(30) Foreign Application Priority Data

Nov. 28, 2014    (JP) ................. 2014-242188

(51) Int. Cl.
*G06K 7/10* (2006.01)
*G02B 5/09* (2006.01)
(Continued)

(52) U.S. Cl.
CPC ............. *G02B 5/09* (2013.01); *G02B 5/12* (2013.01); *G02B 5/26* (2013.01); *G06F 3/0317* (2013.01);
(Continued)

(58) Field of Classification Search
CPC . G02B 1/00; G02B 5/003; G02B 5/22; G02B 5/09; G06F 3/03545; G06F 3/0421
(Continued)

(56) References Cited

U.S. PATENT DOCUMENTS

| 2008/0067479 A1 | 3/2008 | Kimura et al. |
| 2008/0233360 A1 | 9/2008 | Sekine et al. |

(Continued)

FOREIGN PATENT DOCUMENTS

| JP | 2001-243006 A | 9/2001 |
| JP | 2003-256137 A | 9/2003 |

(Continued)

OTHER PUBLICATIONS

Isabel Pastoriza-Santos et al., "One-Pot Synthesis of Ag@TiO$_2$ Core-Shell Nanoparticles and Their Layer-by-Layer Assembly," Langmuir, 2000, pp. 2731-2735, vol. 16, No. 6.

(Continued)

Primary Examiner — Arnel C Lavarias
(74) Attorney, Agent, or Firm — Sughrue Mion, PLLC

(57) ABSTRACT

An infrared reflective patterned product includes an infrared reflective pattern portion which has an infrared reflective material in a region constituting at least a part of a support. The infrared reflective pattern portion has an uneven structure which includes a plurality of protruding or recessed portions. Metal particles are contained on surfaces of the protruding or recessed portions. The particles include 60 number-percent or greater of tabular metal particles in a hexagonal or circular shape, and the tabular particles which are plane-oriented so that an angle between a principal plane of the particle and a surface of the uneven structure closest to the particle is in a range of 0° to ±30° are adjusted to be 50 number-percent or greater of all tabular metal particles. In the patterned product, the ratio of the reflectance of the infrared reflective pattern portion at a wavelength with the highest reflectance in an infrared region of 780 nm to 2500 nm to the reflectance of a non-pattern portion is large in a case where the infrared reflective pattern portion is obliquely irradiated with infrared rays.

10 Claims, 12 Drawing Sheets

(51) Int. Cl.
  *G02B 5/12* (2006.01)
  *G02B 5/26* (2006.01)
  *G06F 3/0354* (2013.01)
  *G06F 3/042* (2006.01)
  *G06F 3/03* (2006.01)

(52) U.S. Cl.
  CPC ........ *G06F 3/03545* (2013.01); *G06F 3/0421* (2013.01)

(58) Field of Classification Search
  USPC .......... 359/350, 355, 356, 359, 360; 428/98, 428/156, 167, 168, 221, 323, 328, 332, 428/357, 402
  See application file for complete search history.

(56) References Cited

U.S. PATENT DOCUMENTS

| | | | |
|---|---|---|---|
| 2010/0277801 A1 | 11/2010 | Nakajima | |
| 2011/0111210 A1* | 5/2011 | Matsunami | C03C 17/007 428/328 |
| 2012/0263381 A1 | 10/2012 | Yoshida | |
| 2014/0004338 A1* | 1/2014 | Kiyoto | C09D 5/32 428/328 |
| 2014/0186608 A1* | 7/2014 | Ohzeki | G02B 5/26 428/220 |
| 2016/0290036 A1* | 10/2016 | Nukui | C08K 3/08 |
| 2016/0291207 A1* | 10/2016 | Yasuda | G02B 1/16 |

FOREIGN PATENT DOCUMENTS

| | | |
|---|---|---|
| JP | 2005-017322 A | 1/2005 |
| JP | 2008-069260 A | 3/2008 |
| JP | 2008-077451 A | 4/2008 |
| JP | 2008-108236 A | 5/2008 |
| JP | 2008-165385 A | 7/2008 |
| JP | 2008-268585 A | 11/2008 |
| JP | 2009-108267 A | 5/2009 |
| JP | 4725417 B2 | 7/2011 |
| JP | 2011-218807 A | 11/2011 |
| JP | 4890800 B2 | 3/2012 |
| JP | 2013-182028 A | 9/2013 |
| JP | 2013-201005 A | 10/2013 |
| JP | 2014-098943 A | 5/2014 |
| JP | 5570305 B2 | 8/2014 |
| JP | 5583988 B2 | 9/2014 |
| JP | 2014-184688 A | 10/2014 |
| JP | 2014-191224 A | 10/2014 |
| JP | 2014-194446 A | 10/2014 |

OTHER PUBLICATIONS

Jurgen Fabian et al., "Near-Infrared Absorbing Dyes," Chemical Reviews, 1992, pp. 1197-1226, vol. 92, No. 6.
International Search Report for PCT/JP2015/080501, dated Jan. 19, 2016 (PCT/ISA/210) English translation.
Written Opinion for PCT/JP2015/080501, dated Jan. 19, 2016 (PCT/ISA/237).
International Preliminary Report on Patentability issued from the International Bureau in counterpart International Application No. PCT/JP2015/080501, dated Jun. 8, 2017.

* cited by examiner (A)

(B)

(A)

(B)

US 10,215,893 B2

INFRARED REFLECTIVE PATTERNED PRODUCT INCLUDING ORIENTED TABULAR METAL PARTICLES

CROSS-REFERENCE TO RELATED APPLICATIONS

This application is a Continuation of PCT International Application No. PCT/JP2015/080501, filed on Oct. 29, 2015, which claims priority under 35 U.S.C. Section 119(a) to Japanese Patent Application No. 2014-242188 filed on Nov. 28, 2014. Each of the above applications is hereby expressly incorporated by reference, in its entirety, into the present application.

BACKGROUND OF THE INVENTION

1. Field of the Invention

The present invention relates to an infrared reflective patterned product and particularly relates to an infrared reflective patterned product in which the ratio of the reflectance of an infrared reflective pattern portion at a wavelength with the highest reflectance in an infrared region of 780 nm to 2500 nm to the reflectance of a non-pattern portion is large in a case where the infrared reflective pattern portion is obliquely irradiated with infrared rays.

2. Description of the Related Art

In recent years, the necessity of converting handwritten characters, pictures, symbols, and the like into electronic data which can be handled by an information processing device has been increased. Particularly, there has been a growing demand for input means for inputting handwritten information to a computer or the like in real time without using a reader such as a scanner. As such input means, an input device which is capable of making a sheet on which dot patterns are printed transparent to visible light, disposing the transparent sheet on the front of a display device, and inputting the content directly handwritten on the transparent sheet to an information processing device has been proposed.

Since these devices suppress influence of printed matter or a display on the design or visibility, these devices are designed such that the pattern of infrared rays is recognized as data. A reading method thereof is occasionally designed such that infrared light is obliquely radiated and then the infrared light reflected by the pattern is read by a reading machine disposed right next to an infrared light irradiation unit.

As a method of preparing a pattern of infrared rays, for example, JP2008-268585A discloses a pattern printed sheet in which an invisible-ray reflective transparent pattern is printed on the surface of a substrate, an ink constituting the transparent pattern contains a material reflecting invisible rays, and the material reflecting the invisible rays is a retroreflective material.

SUMMARY OF THE INVENTION

Here, when an infrared reflective patterned product is used for information processing applications, it has been desired to improve reading accuracy of a pattern by increasing the ratio of the reflectance of an infrared reflective pattern portion to the reflectance of a non-pattern portion at a specific wavelength in an infrared band in a case where the infrared reflective patterned product is obliquely irradiated with infrared rays. Particularly, in a case where a pen type input terminal, disposed in a direction on an extended line of the pen point, is obliquely tilted for use by an infrared irradiation unit and a photodetector, it has been desired to preferably increase the reflectance in a direction which is approximately the same as the direction in which infrared rays are radiated and to more preferably retroreflect the infrared rays to the direction in which the infrared rays are radiated.

However, as the result of research performed, by the present inventors, on infrared reflective materials for which the materials described in these publications are used, it was found that the ratio of the reflectance of an infrared reflective pattern portion at a wavelength with the highest reflectance in an infrared region of 780 nm to 2500 nm to the reflectance of a non-pattern portion is small in a case where a patterned product is not appropriately formed or the infrared reflective pattern portion is obliquely irradiated with infrared rays even if a patterned product is formed.

According to the method described in JP2008-268585A, there is a problem in that the ratio of the reflectance of an infrared reflective pattern portion at a wavelength with the highest reflectance in an infrared region of 780 nm to 2500 nm to the reflectance of a non-pattern portion is small in a case where an infrared reflective patterned product is obliquely irradiated with infrared rays even though reflective light can be read in the case where the infrared reflective patterned product is obliquely irradiated with infrared rays.

JP5570305B discloses, as a member capable of reflecting infrared rays, a heat ray shielding material which includes a metal particle-containing layer containing at least one type of metal particles and in which the metal particles include 60 number-percent or greater of tabular metal particles in an approximately hexagonal shape or an approximately circular shape, the tabular metal particles are plane-oriented so that an angle between a principal plane of the tabular metal particle and one surface of the metal particle-containing layer is in a range of 0° to ±30°, the average interparticle distance of the tabular metal particles adjacent to each other in the horizontal direction in the metal particle-containing layer is $1/10$ or greater of the average particle diameter of the tabular metal particles, and the surface resistance is $9.9 \times 10^{12} \Omega/\square$ or greater. However, conventional infrared reflective materials for which tabular metal particles are used do not show diffusion reflectance nor retroreflectance. It was understood that reflected light cannot be received by a light receiving unit in the case where the infrared reflective patterned product is obliquely irradiated with infrared rays because most of the infrared reflective materials described in JP5570305B specular-reflect infrared rays.

Further, a typical retroreflective member that does not have a pattern has been known. For example, JP4890800B discloses a transparent wavelength selective retroreflector including an optical structure layer which has a surface having a structure provided with a plurality of cube corner type cavities and a practically planar rear surface and is formed of a light-transmitting material; and a wavelength selective reflection layer which is provided on the surface of the optical structure layer and transmits visible light and selectively reflects light in a specific wavelength region other than visible light, in which the wavelength selective reflection layer selectively reflects infrared rays.

Further, JP5583988B discloses an optical product including an optical layer which has an incident surface on which light is incident; and a wavelength selective reflection film which is formed in the optical layer, in which the wavelength selective reflection film is formed of a plurality of wavelength selective reflection films inclined with respect to the incident surface, the plurality of wavelength selective reflection films are arranged in parallel with each other, and light in a wavelength band other than a specific wavelength band of 780 nm to 2100 nm is reflected while near infrared light mainly in a specific wavelength band of 780 nm to 2100 nm is selectively and directionally reflected in a direction other than the direction of specular reflection (−θ, φ+180°) from among light incident on the incident surface at incident angles (θ, φ) (here, θ: an angel formed by a perpendicular line with respect to the incident surface and incident light incident on the incident surface or reflected light emitted from the incident surface, φ: an angle between a specific straight line in the incident surface and a component obtained by projecting the incident light or the reflected light on the incident surface). Since retroreflection occurs when the method described in JP4890800B or JP5583988 is used, reflected light can be received by the light receiving unit even in a case where infrared rays are obliquely radiated. However, the formability of a retroreflection member is poor in both cases because a dielectric multilayer film is used as an infrared reflective material in JP4890800 and an alternate multilayer film of a metal film and a silver film is used as an infrared reflective material in JP5583988B. It was understood that the ratio of the reflectance of the infrared reflective pattern portion at a wavelength with the highest reflectance in an infrared region of 780 nm to 2500 nm to the reflectance of the non-pattern portion is small due to the poor formability of the retroreflective member in the case where infrared rays are obliquely radiated even if a pattern is formed in accordance with an aspect of obliquely tilting and using a pen type input terminal according to the method described in JP4890800 or JP5583988B.

An object of the present invention is to provide an infrared reflective patterned product in which the ratio of the reflectance of an infrared reflective pattern portion at a wavelength with the highest reflectance in an infrared region of 780 nm to 2500 nm to the reflectance of a non-pattern portion is large in a case where the infrared reflective pattern portion is obliquely irradiated with infrared rays.

As the result of intensive research conducted by the present inventors in order to solve the above-described problems, it was understood that an infrared reflective patterned product with improved diffusion reflectance or retroreflectance can be prepared by controlling tabular metal particles to be arranged along the uneven structure.

Specifically, it was found that the above-described problems can be solved by providing an infrared reflective patterned product including an infrared reflective pattern portion which includes an infrared reflective material in a region constituting at least a part of a support, in which the infrared reflective pattern portion has an uneven structure that includes a plurality of protruding portions and/or recessed portions, at least one type of metal particles are contained on at least one surface from among the protruding portions and/or recessed portions of the uneven structure of the infrared reflective pattern portion, the metal particles include 60 number-percent or greater of tabular metal particles in a hexagonal shape or a circular shape, and the tabular metal particles which are plane-oriented so that an angle between a principal plane of the tabular metal particle and a surface of the uneven structure closest to the tabular metal particle is in a range of 0° to ±30° are adjusted to be 50 number-percent or greater of all tabular metal particles, thereby completing the present invention.

The present invention and preferred aspects of the present invention which are specific means for solving the above-described problems are as follows.

[1] An infrared reflective patterned product comprising: an infrared reflective pattern portion which includes an infrared reflective material in a region constituting at least a part of a support, in which the infrared reflective pattern portion has an uneven structure that includes a plurality of protruding portions and/or recessed portions, at least one type of metal particles are contained on at least one surface from among the protruding portions and/or recessed portions of the uneven structure of the infrared reflective pattern portion, the metal particles include 60 number-percent or greater of tabular metal particles in a hexagonal shape or a circular shape, and the tabular metal particles which are plane-oriented so that an angle between a principal plane of the tabular metal particle and a surface of the uneven structure closest to the tabular metal particle is in a range of 0° to ±30° are adjusted to be 50 number-percent or greater of all tabular metal particles.

[2] It is preferable that the infrared reflective patterned product according to [1] further comprises an overcoat layer which fills the uneven structure on a surface side provided with the infrared reflective pattern portion on the support.

[3] In the infrared reflective patterned product according to [2], it is preferable that a difference in refractive index between the overcoat layer and the support is 0.05 or less.

[4] In the infrared reflective patterned product according to [2] or [3], it is preferable that the support and the overcoat layer are transparent.

[5] In the infrared reflective patterned product according to any one of [1] to [4], it is preferable that the uneven structure is in a prism shape, a pyramidal prism shape, a hemispherical shape, or a corner cube shape.

[6] In the infrared reflective patterned product according to any one of [1] to [5], it is preferable that the size of the uneven structure is in a range of 1 μm to 100 μm.

[7] In the infrared reflective patterned product according to any one of [1] to [6], it is preferable that the highest reflectance of the infrared reflective pattern portion in an infrared region of 780 nm to 2500 nm is 20% or greater.

[8] In the infrared reflective patterned product according to any one of [1] to [7], it is preferable that the transmittance of the infrared reflective patterned product at 550 nm is 60% or greater.

[9] In the infrared reflective patterned product according to any one of [1] to [8], it is preferable that a wavelength with the highest reflectance in the infrared region of 780 nm to 2500 nm is present in a band of 780 nm to 1100 nm.

[10] It is preferable that the infrared reflective patterned product according to any one of [1] to [9] is a sheet to be mounted on a surface or the front of a display device capable of displaying an image.

According to the present invention, it is possible to provide an infrared reflective patterned product in which the ratio of the reflectance of an infrared reflective pattern portion at a wavelength with the highest reflectance in an infrared region of 780 nm to 2500 nm to the reflectance of a non-pattern portion is large in a case where the infrared reflective pattern portion is obliquely irradiated with infrared rays.

DESCRIPTION OF THE PREFERRED EMBODIMENTS

Figure 1:
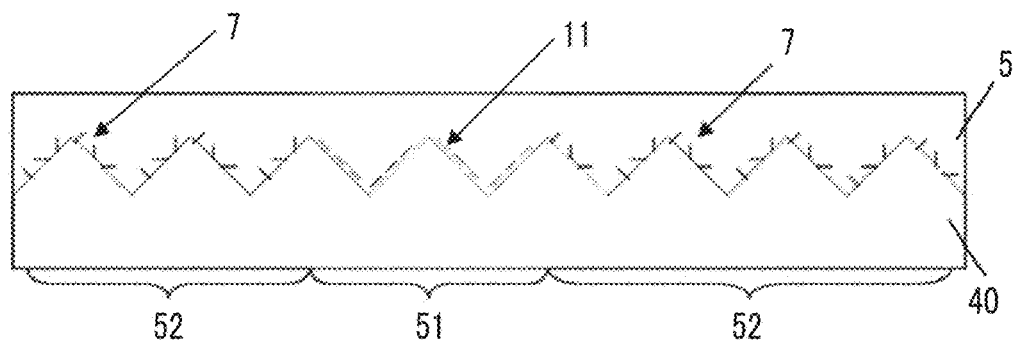
FIG. 1 is a view schematically illustrating a cross section of an infrared reflective patterned product according to an example of the present invention.

Hereinafter, an infrared reflective patterned product of the present invention will be described in detail.

The description of constituent elements described below is made based on representative embodiments of the present invention, but the present invention is not limited to those embodiments. In the present specification, the numerical ranges shown using "to" indicate ranges including the numerical values described before and after "to" as the lower limits and the upper limits.

[Infrared Reflective Patterned Product]

The infrared reflective patterned product of the present invention includes an infrared reflective pattern portion which includes an infrared reflective material in a region constituting at least a part of a support, in which the infrared reflective pattern portion has an uneven structure that includes a plurality of protruding portions and/or recessed portions, at least one type of metal particles are contained on at least one surface from among the protruding portions and recessed portions of the uneven structure of the infrared reflective pattern portion, the metal particles include 60 number-percent or greater of tabular metal particles in a hexagonal shape or a circular shape, and the tabular metal particles which are plane-oriented so that an angle between a principal plane of the tabular metal particle and a surface of the uneven structure closest to the tabular metal particle is in a range of 0 to ±30° are adjusted to be 50 number-percent or greater of all tabular metal particles.

With such a configuration, an infrared reflective patterned product in which the ratio of the reflectance of the infrared reflective pattern portion at a wavelength with the highest reflectance in an infrared region of 780 nm to 2500 nm to the reflectance of a non-pattern portion is large in a case where the infrared reflective pattern portion is obliquely irradiated with infrared rays is obtained.

The infrared reflective patterned product of the present invention includes an infrared reflective pattern portion containing an infrared reflective material in a region constituting at least a part of a support. It is preferable that the infrared reflective patterned product of the present invention includes a non-pattern portion in a region constituting at least a part of a region of the support on which the pattern portion is not formed and more preferable that the infrared reflective patterned product includes an infrared absorbing material and a non-pattern portion. In the present specification, the infrared reflective pattern portion is distinguished from the non-pattern portion not by whether both shapes are pattern-like but by the relative heights of both infrared reflectances. In other words, the "infrared reflective pattern portion" indicates a portion with a higher infrared reflectance in an infrared irradiation direction of infrared rays, which are obliquely incident, than the infrared reflectance of the "non-pattern portion" in a case where infrared rays are obliquely radiated. Specifically, a portion having a reflectance twice (the preferable range is the same as the preferable range of the ratio of the reflectance of the infrared reflective pattern portion described below to the reflectance of the non-pattern portion) the reflectance of the non-pattern portion absorbing infrared rays in a wavelength with the highest reflectance in an infrared region of 780 nm to 2500 nm in the infrared reflective pattern portion is large in a case where the infrared reflective pattern portion is obliquely irradiated with infrared rays is referred to as the "infrared reflective pattern portion".

Specifically, a portion having a high infrared reflectance is conveniently referred to as a pattern portion based on the fact that a portion from which reflected light is detected by a known infrared sensor is typically referred to as a pattern portion in a case where the infrared reflective patterned product is used as a sheet to be mounted on the surface or on the front of a display device capable of displaying an image. Therefore, the non-pattern portion may not have a uniform surface or may be in the form with a hole in the plane.

Further, the infrared reflective pattern portion is also simply referred to as the pattern portion.

The angle at which the infrared reflective pattern portion is obliquely irradiated with infrared rays is not particularly limited, but the incident angle in a case where the normal direction of a principal plane on which the uneven structure of the support of the infrared reflective patterned product is not formed is set to 0° is preferably in a range of 5° to 75°, more preferably in a range of 15° to 60°, particularly preferably in a range of 30° to 50°, and more particularly preferably 45°.

In the present specification, for example, an angle of "45°", "parallel", "vertical", or "orthogonal" means that a difference with a precise angle is less than 5° unless otherwise noted. The difference with a precise angle is preferably less than 4° and more preferably less than 3°.

According to a preferred embodiment of the infrared reflective patterned product of the present invention, the transmittance in a visible range (preferably 550 nm) can be increased and the reflectance in a visible range can be decreased. Further, according to the preferred embodiment of the infrared reflective patterned product of the present invention, a transparent support can be used as the support.

Here, since tabular metal particles (for example, tabular silver particles) in a hexagonal to circular shape are slightly absorbed by a visible light portion in many cases, the visibility of the pattern portion is high when the metal particle-containing layer containing tabular metal particles (for example, tabular silver particles) in a hexagonal to circular shape is patterned on the support. Meanwhile, according to the preferred embodiment of the infrared reflective patterned product of the present invention, a film in which the metal particle-containing layer is inconspicuous is obtained by providing the metal particle-containing layer containing tabular metal particles (for example, tabular silver particles) in a hexagonal to circular shape to have a film shape without patterning the metal particle-containing layer on the surface.

In addition, according to the preferred embodiment of the infrared reflective patterned product of the present invention, a difference in visible light transmittance between the infrared reflective pattern portion and the non-pattern portion is set to be small (the pattern portion is inconspicuous) by patterning an infrared absorbing material having a high visible light transmittance without patterning the metal particle-containing layer containing tabular metal particles (for example, tabular silver particles) in a hexagonal to circular shape on the support. In a case where the metal particle-containing layer is not patterned, the infrared reflective pattern portion is extremely inconspicuous. Particularly, the infrared reflective pattern portion becomes inconspicuous when compared to the infrared reflective patterned product which includes an infrared reflective pattern portion obtained by patterning the metal particle-containing layer on the support and includes a non-pattern portion through which infrared rays are transmitted.

Moreover, based on the properties of the tabular metal particles (for example, tabular silver particles) in a hexagonal to circular shape, the peak wavelength or the reflection intensity of infrared rays to be reflected can be freely adjusted while a thin layer of the metal particle-containing layer is maintained.

In conventional infrared reflective materials having an uneven structure, a dielectric multilayer film or an alternate multilayer film of a metal film and a silver film is used as an infrared reflective material, the formability is poor due to the quality of the infrared reflective material, a small pitch cannot be made, and thus the film thickness is increased. Further, there are problems in that formability is poor and interlayer peeling easily occurs. According to the preferred embodiment of the infrared reflective patterned product of the present invention, a continuous film is not formed because tabular metal particles in a hexagonal to circular shape are used as the infrared reflective material. Therefore, the formability is excellent, a pitch can be made small, and the film thickness is decreased. Further, since the formability is excellent, the retroreflectance is high and the ratio of the reflectance of the infrared reflective pattern portion at a wavelength with the highest reflectance in an infrared region of 780 nm to 2500 nm to the reflectance of the non-pattern portion is large in a case where the infrared reflective pattern portion is obliquely irradiated with infrared rays. Further, interlayer peeling is unlikely to occur since the number of layers of the infrared reflective material is small.

<Characteristics of Infrared Reflective Patterned Product>

In the infrared reflective patterned product of the present invention, the highest reflectance in an infrared region of 780 nm to 2500 nm is preferably 10% or greater, more preferably 15% or greater, particularly preferably 20% or greater, more particularly preferably 25% or greater, and still more particularly preferably 30% or greater in a case where the infrared reflective pattern portion is obliquely irradiated with infrared rays at an angle of 45°.

In the infrared reflective patterned product of the present invention, the reflectance of the non-pattern portion at a wavelength where the infrared reflective pattern portion has the highest reflectance in an infrared region of 780 nm to 2500 nm is preferably 20% or less, more preferably 10% or less, particularly preferably 5% or less, and particularly preferably 3% or less in the case where the infrared reflective pattern portion is obliquely irradiated with infrared rays at an angle of 45°.

In the infrared reflective patterned product of the present invention, the ratio of the reflectance of the infrared reflective pattern portion to the reflectance of the non-pattern portion (the reflectance of the infrared reflective pattern portion/the reflectance of the non-pattern portion) at a wavelength where the infrared reflective pattern portion has the highest reflectance in an infrared region of 780 nm to 2500 nm is preferably 2.0 or greater, more preferably 3.5 or greater, particularly preferably 5.0 or greater, more particularly preferably 10.0 or greater, and still more particularly preferably 20.0 or greater.

In the infrared reflective patterned product of the present invention, the wavelength with the highest reflectance in an infrared region of 780 nm to 2500 nm is present preferably in a band of 780 nm to 1100 nm, more preferably in a band of 800 to 1100 nm, and particularly preferably in a band of 800 to 1050 nm.

According to the present invention, the wavelength with the highest reflectance in an infrared region of 780 nm to 2500 nm in the infrared reflective patterned product of the present invention can be set as a reflection peak wavelength A (nm) of the tabular metal particles.

The transmittance of the infrared reflective patterned product of the present invention at 550 nm is preferably 60% or greater, more preferably 65% or greater, particularly preferably 70% or greater, more particularly preferably 75% or greater, and still more particularly preferably 80% or greater. It is preferable that the transmittance thereof at 550 nm is 60% or greater from the viewpoint of easily seeing an image when the infrared reflective patterned product is used as a sheet to be mounted on the surface or on the front of a display device capable of displaying an image.

<Configuration of Infrared Reflective Patterned Product>

The infrared reflective patterned product of the present invention includes an infrared reflective pattern portion containing an infrared reflective material in a region constituting at least a part of a support, and the infrared reflective pattern portion has an uneven structure that includes a plurality of protruding portions and/or recessed portions.

It is preferable that the non-pattern portion is included in a region constituting at least a part of a region of the support on which the pattern portion is not formed.

Further, an embodiment in which the infrared reflective patterned product has other layers such as an overcoat layer, a pressure sensitive adhesive layer, a metal oxide particle-containing layer, a back coat layer, a hard coat layer, and an insulating layer as necessary is also preferable.

Hereinafter, a preferable configuration of the infrared reflective patterned product will be described with reference to the accompanying drawings.

Figure 2:
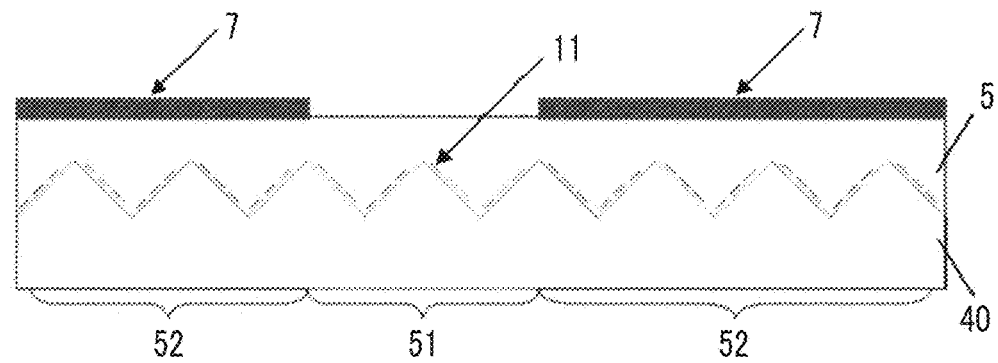
FIG. 2 is a view schematically illustrating a cross section of an infrared reflective patterned product according to another example of the present invention.
Figure 18:
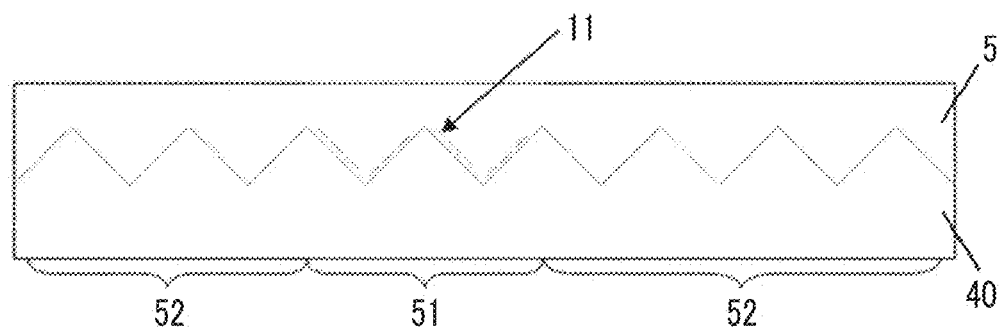
FIG. 18 is a view schematically illustrating another example of the cross section of the infrared reflective patterned product of the present invention.
Figure 19:
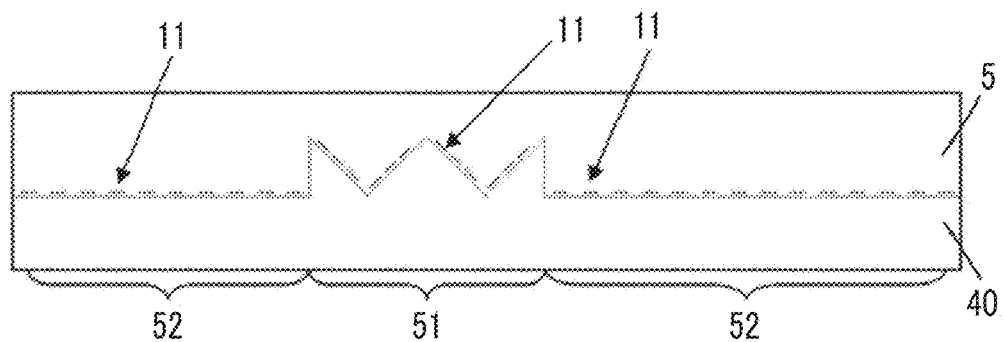
FIG. 19 is a view schematically illustrating another example of the cross section of the infrared reflective patterned product of the present invention.

According to the layer configuration of the infrared reflective patterned product of the present invention, the infrared reflective patterned product includes an infrared reflective pattern portion 51 that contains an infrared reflective material in a region constituting at least a part of a support 40 as illustrated in examples of FIGS. 1, 2, 18, and 19. The infrared reflective patterned product of the present invention may include a metal particle-containing layer (not illustrated) containing tabular metal particles in a hexagonal to circular shape in a region constituting at least a part of the same layer on the support as illustrated in FIG. 18 or may include a metal particle-containing layer (not illustrated) containing tabular metal particles in a hexagonal to circular shape in all regions constituting the same layer on the support as illustrated in FIGS. 1, 2, and 19. The "same layer" indicates a layer having the same composition. In FIG. 1, the infrared reflective pattern portion 51 contains, as an infrared reflective material, tabular metal particles 11 in a hexagonal shape or a circular shape, and the tabular metal particles 11 which are plane-oriented so that an angle between a principal plane of the tabular metal particle 11 and a surface of the uneven structure closest to the tabular metal particle is in a range of 0° to ±30° are adjusted to be 50 number-percent or greater of all tabular metal particles, in the infrared reflective pattern portion 51.

Further, the infrared reflective patterned product 100 illustrated in FIGS. 1, 2, 18, and 19 includes a non-pattern portion 52 in a region constituting at least a part of a region of the support 40 on which the pattern portion 51 is not formed. The non-pattern portion 52 may be a non-pattern portion that absorbs infrared rays as illustrated in FIGS. 1 and 2, a non-pattern portion through which infrared rays are transmitted as illustrated in FIG. 18, a non-pattern portion which specular-reflects (obliquely incident) infrared rays as illustrated in FIG. 19, or a non-pattern portion which scatters infrared ray, but a non-pattern portion that absorbs infrared rays or a non-pattern portion through which infrared rays are transmitted is preferable. In the infrared reflective patterned product, the non-pattern portion absorbing infrared rays indicates a portion which contains an infrared absorbing material in the surface of the support and absorbs infrared rays. In the infrared reflective patterned product of FIG. 1, the non-pattern portion 52 contains, as an infrared absorbing material 7, randomly arranged tabular metal particles in a hexagonal shape or a circular shape, and the tabular metal particles 11 which are plane-oriented so that an angle between a principal plane of the tabular metal particle 11 and a surface of the uneven structure closest to the tabular metal particle is in a range of 0° to ±30° are adjusted to be less than 50 number-percent of all tabular metal particles, in the infrared reflective pattern portion 51. Further, as illustrated in FIG. 18, the non-pattern portion 52 may not contain tabular metal particles in a hexagonal to circular shape.

The non-pattern portion 52 may or may not include a metal particle-containing layer (not illustrated) containing tabular metal particles in a hexagonal to circular shape on the support 40. In the infrared reflective patterned product of FIG. 1, the non-pattern portion 52 includes a metal particle-containing layer (not illustrated) containing tabular metal particles in a hexagonal to circular shape. Further, in the infrared reflective patterned product of FIG. 1, the non-pattern portion includes a metal particle-containing layer (not illustrated) containing tabular metal particles in a hexagonal to circular shape in all regions constituting the same layer on the support 40.

Meanwhile, according to another preferred embodiment of the infrared reflective patterned product of the present invention as illustrated in FIG. 2, the non-pattern portion 52 may include a metal particle-containing layer (not illustrated) containing tabular metal particles in a hexagonal to circular shape, and the infrared absorbing material 7 may be laminated on the metal particle-containing layer directly or through an overcoat layer 5. It is preferable that the infrared reflective patterned product of the present invention includes the overcoat layer 5 formed so as to entirely cover the infrared reflective pattern portion 51 and the non-pattern portion 52 because scratch resistance can be increased. Even in the infrared reflective patterned product of FIG. 2, the non-pattern portion includes a metal particle-containing layer (not illustrated) containing tabular metal particles in a hexagonal to circular shape in all regions constituting the same layer on the support 40.

Here, the "reflection peak wavelength A of the tabular metal particles" in the present specification indicates a wavelength with the highest reflectance in the reflection spectrum obtained by measuring the pattern portion containing tabular metal particles in a wavelength region of 780 nm to 2500 nm using an integrating sphere spectrophotometer.

In characteristics of the surface plasmon resonance, the reflection peak wavelength of the tabular metal particles substantially coincides with the absorption peak wavelength. In this case, the reflection peak wavelength is larger than the absorption peak wavelength in some cases depending on the surrounding refractive index environment of the tabular metal particles (coating with a resin or ceramic or distribution to an air interface).

The absorption wavelength here indicates a wavelength in which the value obtained by subtracting the transmittance and the reflectance from 100% becomes the maximum when the spectral transmission and reflection spectrum in a wavelength region of 300 nm to 2500 nm are measured in each wavelength.

In the infrared reflective patterned product of the present invention, the length of one side of the pattern portion is preferably 4 μm or greater, more preferably 5 μm or greater, and particularly preferably 10 μm or greater per part of the pattern portion.

The upper limit of the size per part of the pattern portion is not particularly limited.

Figure 3:
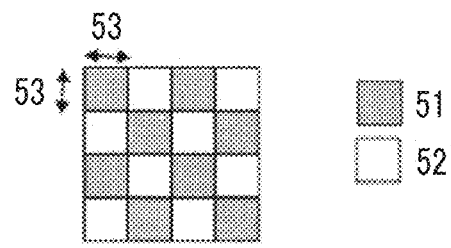
FIG. 3 is a view schematically illustrating an upper surface of an infrared reflective patterned product according to another example of the present invention.

Here, in regard to the length of one side of the pattern portion, lengths 53 of the height and the width of the pattern portion may be the same as each other in a case where a substantially square pattern is repeated as illustrated in FIG. 3. Meanwhile, the length of one side of the infrared reflective pattern portion may be different from the length of another side of the infrared reflective pattern portion in a case where a substantially rectangular pattern is repeated. The shape of the pattern reflecting infrared of the infrared reflective patterned product of the present invention is not particularly limited and the infrared reflective pattern portion may have any shape such as a circle, an ellipse, a mesh, or a line.

In addition, it is preferable that the infrared reflective patterned product of the present invention includes a pressure sensitive adhesive layer or an adhesive layer on a surface of the support 40 provided with the infrared reflective pattern portion 51 or the opposite surface. With such a configuration, the infrared reflective patterned product of the present invention can be easily attached to the surface of a display device when the infrared reflective patterned product is used as a sheet to be mounted on the surface or on the front of the display device capable of displaying an image.

Further, the infrared reflective patterned product of the present invention is not limited to an embodiment in which the support 40, the metal particle-containing layer containing tabular metal particles in a hexagonal to circular shape, and the infrared absorbing material 7 used to form the non-pattern portion in an arbitrary shape are laminated in this order as illustrated in FIG. 2. Although not illustrated in the figures, it is also preferable that the infrared reflective patterned product according to an embodiment in which the support 40, the infrared absorbing material 7 used to form the non-pattern portion in an arbitrary shape, and the metal particle-containing layer containing tabular metal particles in a hexagonal to circular shape are laminated in this order includes a pressure sensitive adhesive layer or an adhesive layer on a surface on the same side as the surface of the support 40 provided with the infrared reflective pattern portion 51. With such a configuration, infrared rays incident from the support 40 side can be reflected by the pattern portion 51 and can be absorbed by the non-pattern portion 52, and the infrared reflective patterned product of the present invention can be easily attached to the surface of a display device when the infrared reflective patterned product is used as a sheet to be mounted on the surface or on the front of the display device capable of displaying an image.

Figure 8:
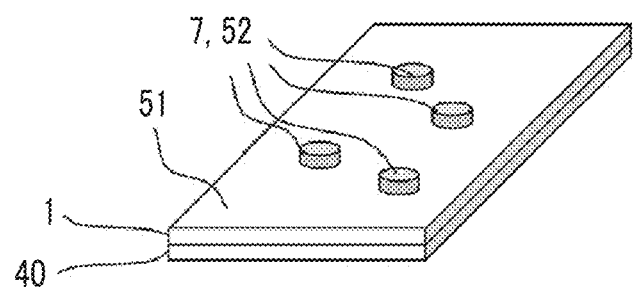
FIG. 8 is a view schematically illustrating an example of the infrared reflective patterned product of the present invention when seen from obliquely above.
Figure 9:
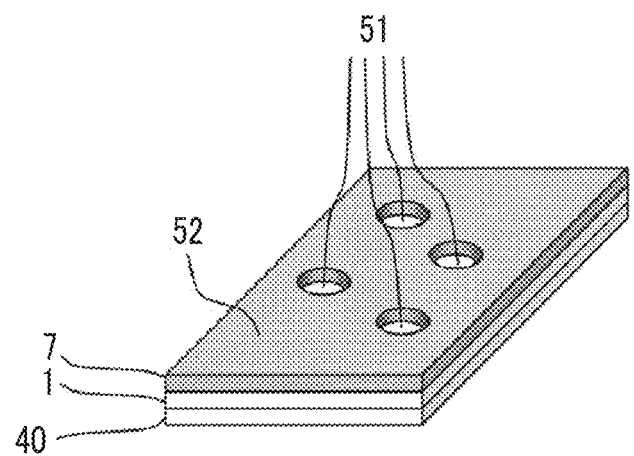
FIG. 9 is a view schematically illustrating another example of the infrared reflective patterned product of the present invention when seen from obliquely above.
Figure 10:
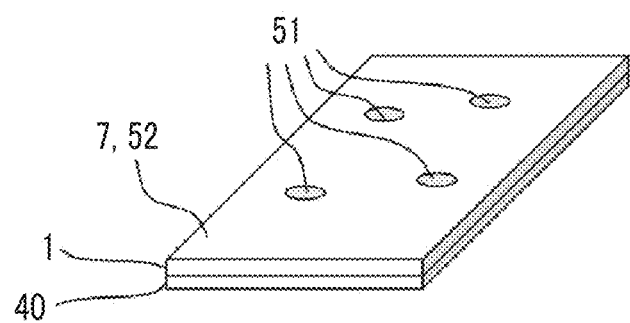
FIG. 10 is a view schematically illustrating another example of the infrared reflective patterned product of the present invention when seen from obliquely above.
Figure 11:
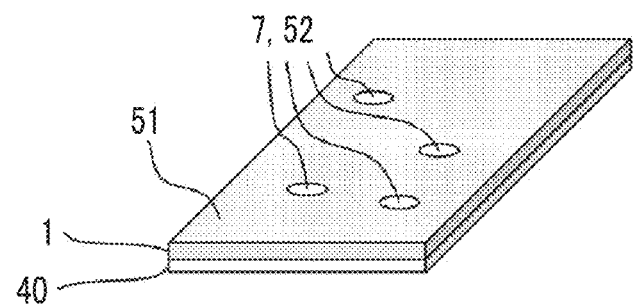
FIG. 11 is a view schematically illustrating another example of the infrared reflective patterned product of the present invention when seen from obliquely above.

FIGS. 8 to 11 are views schematically illustrating preferable examples of the infrared reflective patterned product of the present invention when seen from obliquely above. In the examples of the infrared reflective patterned product of the present invention illustrated in FIGS. 8 to 11, the infrared reflective pattern portion and the non-pattern portion will be described. FIGS. 8 and 9 show an embodiment in which the metal particle-containing layer 1 containing tabular metal particles in a hexagonal to circular shape is provided on the support 40, the infrared absorbing material 7 is formed in a region corresponding to the non-pattern portion 52 on the metal particle-containing layer 1, and the metal particle-containing layer 1 which is not provided with the infrared absorbing material 7 is used as the infrared reflective pattern portion 51. FIGS. 10 and 11 show an embodiment in which the metal particle-containing layer 1 containing tabular metal particles in a hexagonal to circular shape is provided on the support 40, the infrared absorbing material 7 that is in the form of randomly arranged tabular metal particles in a hexagonal to circular shape is formed in a region corresponding to the non-pattern portion 52 on the metal particle-containing layer 1, and the metal particle-containing layer 1 in which the tabular metal particles in a hexagonal to circular shape are not randomly arranged is used as the infrared reflective pattern portion 51. In the examples of the infrared reflective patterned product of the present invention illustrated in FIGS. 8 to 11, since the metal particle-containing layer 1 in the examples is not patterned, the visible light transmittance of the infrared reflective pattern portion can be set to be approximately the same as the visible light transmittance of the non-pattern portion, and thus the infrared reflective pattern portion is extremely inconspicuous. Further, the infrared reflective pattern portion and the non-pattern portion in visible light can made to be inconspicuous by setting the visible light transmittance of the infrared absorbing material 7 to be approximately the same as the visible light transmittance of the metal particle-containing layer 1.

<Infrared Reflective Pattern Portion>

The infrared reflective patterned product of the present invention includes an infrared reflective pattern portion containing an infrared reflective material in a region constituting at least a part of a support, the infrared reflective pattern portion has an uneven structure that includes a plurality of protruding portions and/or recessed portions, at least one type of metal particles are contained on at least one surface from among the protruding portions and/or recessed portions of the uneven structure of the infrared reflective pattern portion, the metal particles include 60 number-percent or greater of tabular metal particles in a hexagonal shape or a circular shape, and the tabular metal particles which are plane-oriented so that an angle between a principal plane of the tabular metal particle and a surface of the uneven structure closest to the tabular metal particle is in a range of 0° to ±30° are adjusted to be 50 number-percent or greater of all tabular metal particles.

The metal particle-containing layer is a layer containing at least one type of metal particles. It is preferable that the metal particles are tabular metal particles (metal particles in a tabular form) and the tabular metal particles are segregated on one surface of the metal particle-containing layer.

—1-1. Metal Particles—

In the infrared reflective patterned product of the present invention, at least one type of metal particles are contained on at least one surface from among the protruding portions and/or recessed portions of the uneven structure of the infrared reflective pattern portion, the metal particles include 60 number-percent or greater of tabular metal particles in a hexagonal shape or a circular shape, and the tabular metal particles which are plane-oriented so that an angle between a principal plane of the tabular metal particle and a surface of the uneven structure closest to the tabular metal particle is in a range of 0° to ±30° are adjusted to be 50 number-percent or greater of all tabular metal particles.

As the form of presence of the tabular metal particles in a hexagonal to circular shape in the metal particle-containing layer, the tabular metal particles which are plane-oriented so that an angle between a principal plane of the tabular metal particle and a surface of the uneven structure closest to the tabular metal particle is in a range of 00 to ±30° in average are adjusted to be 50 number-percent or greater of all tabular metal particles, it is preferable that the tabular metal particles which are plane-oriented so that an angle therebetween is in a range of 00 to ±20° in average are adjusted to be 50 number-percent or greater of all tabular metal particles, and it is particularly preferable that the tabular metal particles which are plane-oriented so that an angle therebetween is in a range of 0° to ±10° in average are adjusted to be 50 number-percent or greater of all tabular metal particles.

Further, the tabular metal particles which are plane-oriented in the above-described range are adjusted to be 50 number-percent or greater of all tabular metal particles, more preferably 70 number-percent or greater of all tabular metal particles, and still more preferably 90 number-percent or greater of all tabular metal particles.

The material of metal particles is not particularly limited and can be suitably selected depending on the purpose thereof, but silver, gold, aluminum, copper, rhodium, nickel, or platinum is preferable from the viewpoint of that heat rays (the definition thereof is the same as the definition of near infrared rays, the same applies to hereinafter) have a high reflectance. Among these, silver is more preferable.

—1-2. Tabular Metal Particles—

Figure 7A:
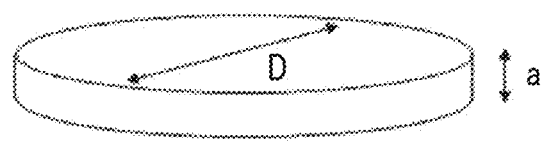
FIG. 7A is a perspective view schematically illustrating an example of a shape of the tabular metal particle preferably used for the infrared reflective patterned product of the present invention and illustrates a circular tabular metal particle.
Figure 7B:
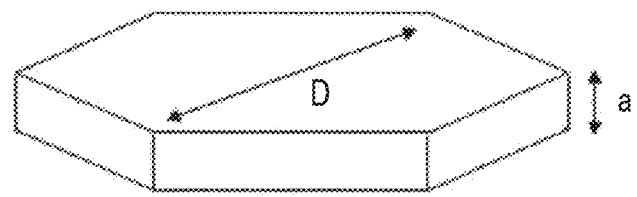
FIG. 7B is a perspective view schematically illustrating an example of a shape of the tabular metal particle preferably used for the infrared reflective patterned product of the present invention and illustrates a hexagonal tabular metal particle.

The tabular metal particles are not particularly limited as long as the particles respectively have two principal planes (see FIGS. 7A and 7B) and can be suitably selected depending on the purpose thereof. Examples of the shape of the tabular metal particles include a hexagonal shape, a circular shape, and a triangular shape. Among these, from the viewpoint that the visible light transmittance is high, a hexagon or more-angled polygon to circular shape is more preferable and a hexagonal shape or a circular shape is particularly preferable.

In the present specification, the circular shape indicates a shape in which the number of sides having a length of 50% or greater of the average equivalent circle diameter of tabular metal particles described below is 0 per one tabular metal particle. The tabular metal particle in a circular shape is not particularly limited as long as the tabular metal particle has a round shape without corners when the tabular metal particle is observed from above of the principal plane using a transmission electron microscope (TEM) and can be suitably selected depending on the purpose thereof.

In the present specification, the hexagonal shape indicates a shape in which the number of sides having a length of 20% or greater of the average equivalent circle diameter of tabular metal particles described below is 6 per one tabular metal particle. Further, the same applies to other hexagonal shapes. The tabular metal particle in a hexagonal shape is not particularly limited as long as the tabular metal particle has a hexagonal shape when the tabular metal particle is observed from above of the principal plane using a transmission electron microscope (TEM) and can be suitably selected depending on the purpose thereof. In addition, the angles of the hexagonal shape may be acute angles or obtuse angles, but it is preferable that the angles are blunt from the viewpoint that absorption in a visible light region can be reduced. The degree of angle being obtuse is not particularly limited and can be suitably selected depending on the purpose thereof.

Among the metal particles present on the infrared reflective pattern portion, the tabular metal particles in a hexagonal to circular shape is preferably 60 number-percent or greater, more preferably 65 number-percent or greater, and particularly preferably 70 number-percent or greater with respect to the number of all tabular metal particles. When the proportion of the tabular metal particles in a hexagonal to circular shape is 60 number-percent, the visible light transmittance is increased.

[1-2-1. Plane Orientation]

In the tabular metal particles in a hexagonal to circular shape in the infrared reflective patterned product of the present invention, the tabular metal particles which are plane-oriented so that the angle between a principal plane of the tabular metal particle and a surface of the uneven structure closest to the tabular metal particle is in a range of 0° to ±30° are adjusted to be 50 number-percent or greater of all tabular metal particles.

The state of presence of the tabular metal particles is not particularly limited and can be suitably selected depending on the purpose thereof, but it is preferable that the tabular metal particles are arranged as in FIGS. 6C to 6F.

Figure 6A:
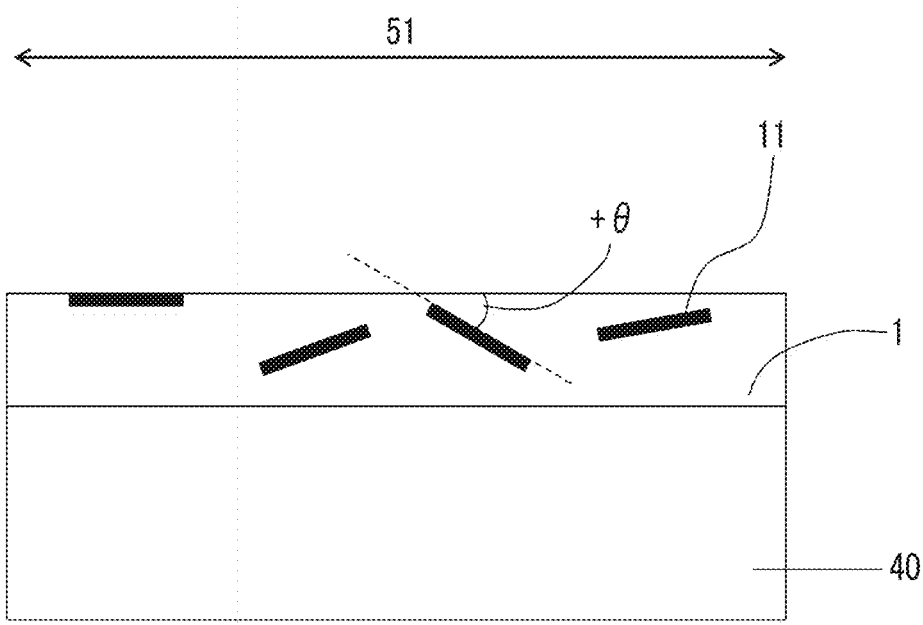
FIG. 6A is a cross-sectional view schematically illustrating a state of presence of a metal particle-containing layer containing tabular metal particles in the infrared reflective patterned product of the present invention and explains an angle ($\theta$) between a principal plane (surface that determines an equivalent circle diameter D) of the tabular metal particle and the surface of an uneven structure closest to the tabular metal particle.
Figure 6B:
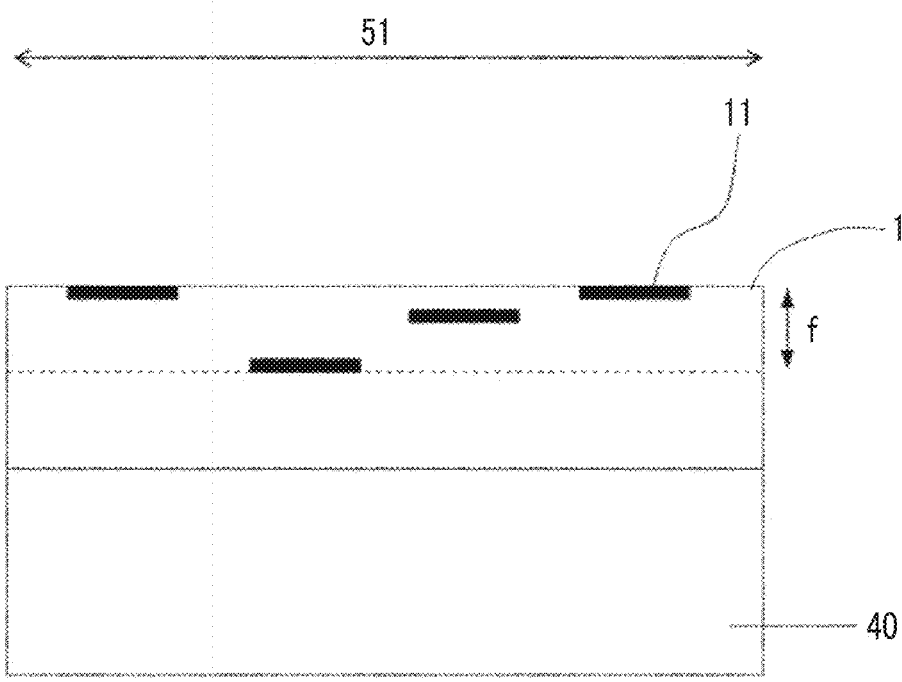
FIG. 6B is a cross-sectional view schematically illustrating a state of presence of the metal particle-containing layer containing tabular metal particles in the infrared reflective patterned product of the present invention and illustrates an area where the tabular metal particles are present in a depth direction of the infrared reflective patterned product of the metal particle-containing layer.
Figure 6C:
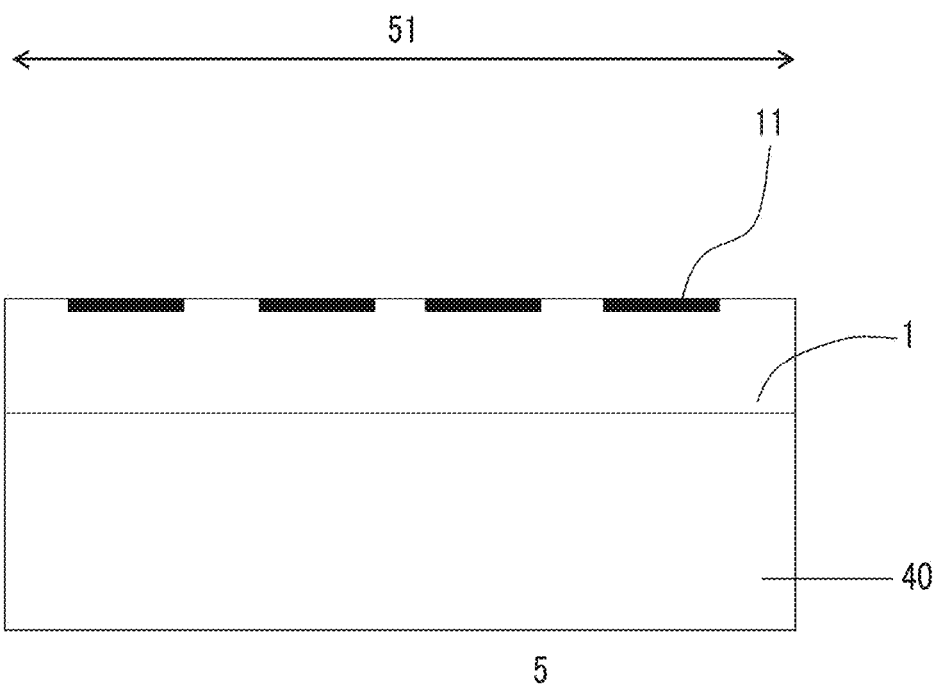
FIG. 6C is a cross-sectional view schematically illustrating another example of a state of presence of the metal particle-containing layer containing tabular metal particles in the infrared reflective patterned product of the present invention.
Figure 6D:
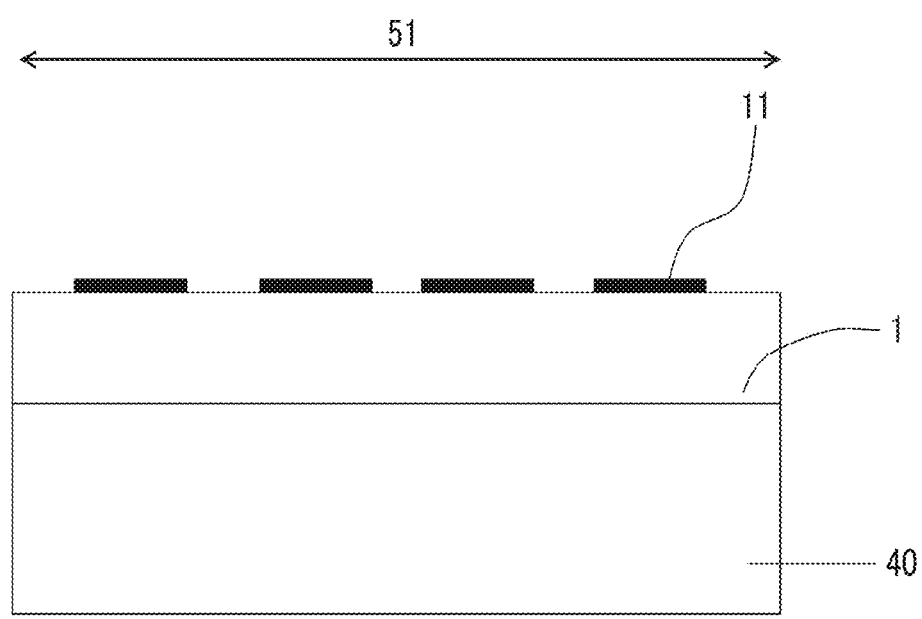
FIG. 6D is a cross-sectional view schematically illustrating another example of a state of presence of the metal particle-containing layer containing tabular metal particles in the infrared reflective patterned product of the present invention.
Figure 6E:
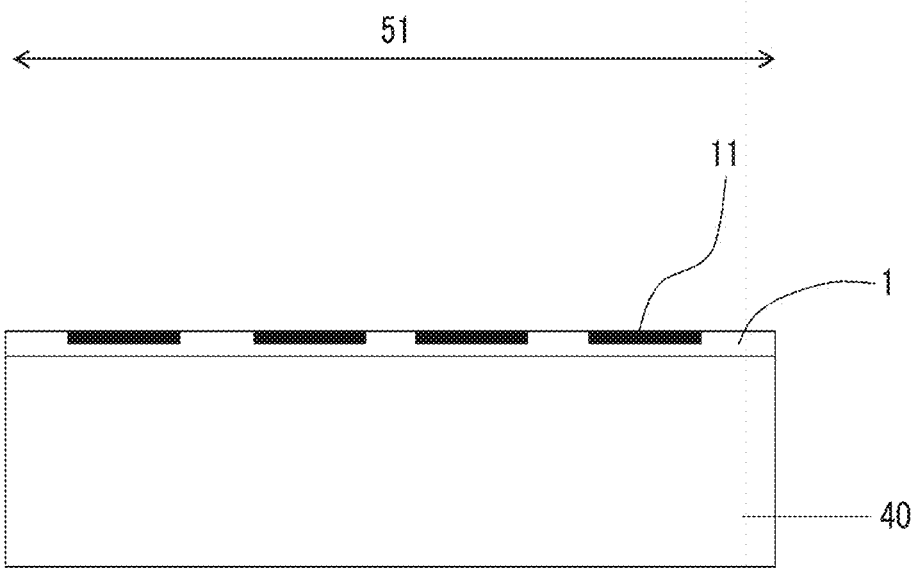
FIG. 6E is a cross-sectional view schematically illustrating another example of a state of presence of the metal particle-containing layer containing tabular metal particles in the infrared reflective patterned product of the present invention.
Figure 6F:
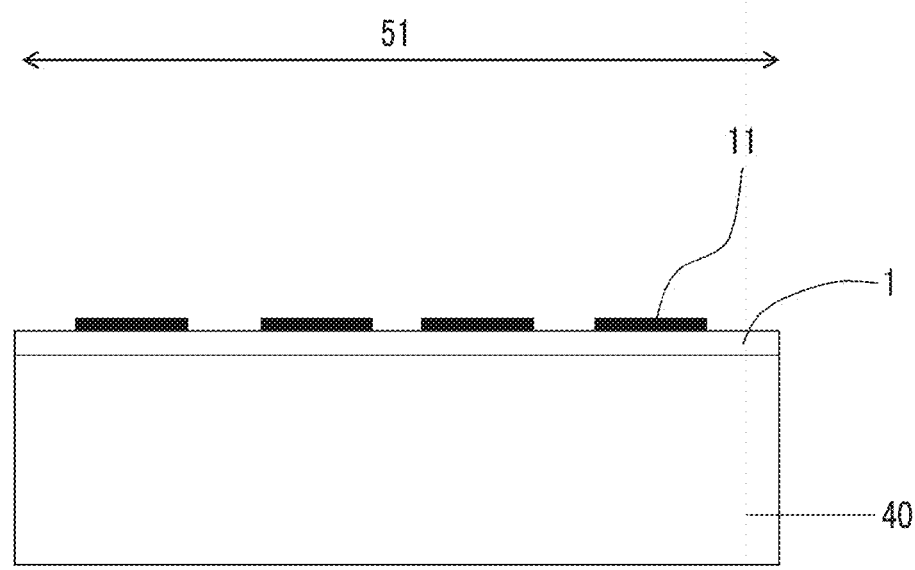
FIG. 6F is a cross-sectional view schematically illustrating another example of a state of presence of the metal particle-containing layer containing tabular metal particles in the infrared reflective patterned product of the present invention.

Here, FIG. 6A to FIG. 6F are cross-sectional views schematically illustrating the state of presence of the metal particle-containing layer containing tabular metal particles in the infrared reflective patterned product of the present invention. FIGS. 6D to 6F illustrate the state of presence of the tabular metal particles 11 in the metal particle-containing layer 1. FIG. 6A is a view explaining an angle (±θ) between a principal plane (surface that determines an equivalent circle diameter D) of the tabular metal particle 11 and a surface of the uneven structure closest to the tabular metal particle. FIG. 6B illustrates an area f where the tabular metal particles are present in a depth direction of the infrared reflective patterned product of the metal particle-containing layer 1.

In FIG. 6A, an angle (±θ) between a principal plane of the tabular metal particle 11 and a surface of the uneven structure closest to the tabular metal particle corresponds to a predetermined range in the plane orientation of the tabular metal particle in a hexagonal to circular shape. In other words, the plane orientation indicates a state in which an inclination angle (±θ) illustrated in FIG. 6A is small when the cross section of the infrared reflective patterned product is observed. Particularly, FIG. 6C shows a state in which a principal plane of the tabular metal particle 11 is in contact with a surface of the uneven structure closest to the tabular metal particle, that is, a state in which the angle θ is 0°. When the angle of plane orientation between a principal plane of the tabular metal particle 11 and a surface of the uneven structure closest to the tabular metal particle, that is, the angle θ in FIG. 6A is greater than ±30°, the reflectance of a predetermined wavelength (for example, a near infrared region from a long wavelength side in a visible light region) of the infrared reflective patterned product is decreased. In the present specification, in a case where the tabular metal particles in which the angle between a principal plane of the tabular metal particle 11 and a surface of the uneven structure closest to the tabular metal particle, that is, the angle θ in FIG. 6A is ±30° or less are adjusted to be less than 50 number-percent of all tabular metal particles, the particles are referred to as randomly arranged tabular metal particles in a hexagonal to circular shape and such randomly arranged tabular metal particles in a hexagonal to circular shape can be used as an infrared absorbing material.

Figure 16:
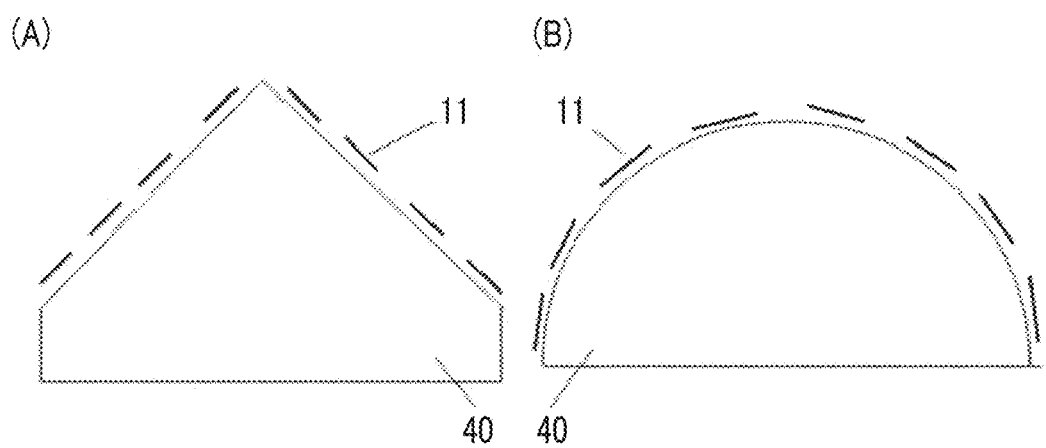
FIG. 16 is a view schematically illustrating an example in which tabular metal particles are disposed on the surfaces of protruding portions of the uneven structure of the infrared reflective patterned product of the present invention.

The surface of the uneven structure closest to the tabular metal particle from the principal plane of the tabular metal particle indicates a plane perpendicular to the vertical line drawn toward the surface of the uneven structure closest to the tabular metal particle from the principal plane of the tabular metal particle. In a case where the surface of the uneven structure is a plane having a prism shape of FIG. 16A, the angle between the principal plane of the tabular metal particle and the surface of the uneven structure closest to the tabular metal particle becomes the surface of the uneven structure including a foot of the vertical line drawn toward the surface of the uneven structure closest to the tabular metal particle from the principal surface of the tabular metal particle. In a case where the surface of the uneven structure is a curved surface having a hemispherical shape of FIG. 16B, the angle between the principal plane of the tabular metal particle and the surface of the uneven structure closest to the tabular metal particle becomes a tangent plane of the surface of the uneven structure and the vertical line drawn toward the surface of the uneven structure closest to the tabular metal particle from the principal surface of the tabular metal particle.

The evaluation of whether the principal surface of the tabular metal particle is plane-oriented with respect to the surface of the uneven structure closest to the tabular metal particle is not particularly limited and can be suitably selected depending on the purpose thereof. For example, a method of preparing an appropriate cross section slice, observing a metal particle-containing layer and tabular metal particles on the slice, and performing the evaluation may be used. Specifically, a method of preparing a cross section sample or a cross section slice sample of an infrared reflective patterned product using a microtome and focused ion beam (FIB), observing the sample using various microscopes (for example, a field emission scanning electron microscope (FE-SEM), a transmission electron microscope (TEM), and the like), and performing the evaluation on the infrared reflective patterned product using imaged obtained from the observation may be exemplified.

The observation of the cross section sample or the cross section slice sample prepared in the above-described manner is not particularly limited as long as the sample can be confirmed whether a principal plane of the tabular metal particle is plane-oriented with respect to one surface (surface of a base material) of the metal particle-containing layer, and the observation method can be suitably selected depending on the purpose thereof. Examples thereof include observation methods using FE-SEM and TEM. The observation may be performed using FE-SEM in a case of the cross section sample and using TEM in a case of the cross section slice sample. In a case where the evaluation is performed using FE-SEM, it is preferable that the images have spatial resolution such that the shape and the inclination angle (±θ in FIG. 6A) of the tabular metal particles can be explicitly determined.

[1-2-2. Average Particle Diameter (Average Equivalent Circle Diameter) and Variation Coefficient]

The average particle diameter (average equivalent circle diameter) of the tabular metal particles in a hexagonal or circular shape can be obtained according to a known method of measuring the projected area through the area on the electron micrograph and correcting the photographic magnification. The average equivalent circle diameter is represented by a diameter of a circle having an area equivalent to the projected area of each particle obtained by the above-described method. The particle diameter distribution (particle size distribution) is obtained from statistics of equivalent circle diameters D of 200 tabular metal particles and the average particle diameter (average equivalent circle diameter) can be acquired by calculating the arithmetic average thereof. The variation coefficient in the particle size distribution of the tabular metal particles can be acquired from a value (%) obtained by dividing the standard deviation of the particle size distribution by the average particle diameter (average equivalent circle diameter).

In the infrared reflective patterned product of the present invention, the variation coefficient in the particle size distribution of the tabular metal particles is preferably 35% or less, more preferably 30% or less, and particularly preferably 20% or less. It is preferable that the variation coefficient thereof is 35% or less from the viewpoint that the reflection wavelength region of heat rays in the infrared reflective patterned product becomes sharp.

The size of the metal particles is not particularly limited and can be suitably selected depending on the purpose thereof, and the average particle diameter thereof is preferably in a range of 10 to 500 nm, more preferably in a range of 20 to 300 nm, and still more preferably in a range of 50 to 200 nm.

[1-2-3. Thickness and Aspect Ratio of Tabular Metal Particle]

In the infrared reflective patterned product of the present invention, the thickness of the tabular metal particles is 14 nm or less, more preferably in a range of 5 to 14 nm, particularly preferably in a range of 5 to 12 nm, and more particularly preferably in a range of 5 to 10 nm.

The aspect ratio of the tabular metal particles is not particularly limited and can be suitable selected depending on the purpose thereof, but is preferably in a range of 6 to 40 and more preferably in a range of 10 to 35 from the viewpoint that the reflectance in an infrared region at a wavelength of 800 nm to 1800 nm is increased. The reflection wavelength becomes less than 800 nm when the aspect ratio is less than 6 and the reflection wavelength becomes greater than 1800 nm when the aspect ratio is greater than 40. Therefore, heat ray reflectivity cannot be sufficiently obtained in some cases.

The aspect ratio indicates a value obtained by dividing the average particle diameter (average equivalent circle diameter) of tabular metal particles by the average particle thickness of the tabular metal particles. The particle thickness corresponds to the distance between principal planes of the tabular metal particles, for example, as shown as a in FIGS. 7A and 7B and can be measured using an atomic force microscope (AFM) or a transmission electron microscope (TEM).

A method of measuring the average particle thickness using AFM is not particularly limited and can be suitably selected depending on the purpose thereof, and a method of adding a particle dispersion liquid containing tabular metal particles dropwise to a glass substrate, drying the glass substrate, and measuring the thickness of one particle may be exemplified.

A method of measuring the average particle thickness using TEM is not particularly limited and can be suitably selected depending on the purpose thereof, and a method of adding a particle dispersion liquid containing tabular metal particles dropwise to a silicon substrate, drying the silicon substrate, performing a coating treatment through carbon vapor deposition or metal vapor deposition, preparing a cross section slice by carrying out focused ion beam (FIM) processing, observing the cross section using TEM, and measuring the thickness of particles may be exemplified.

[1-2-4. Thickness of Metal Particle-Containing Layer and Range in which Tabular Metal Particles are Present]

In the infrared reflective patterned product of the present invention, a thickness d of the infrared reflective pattern portion corresponding to the coating film thickness of the metal particle-containing layer that contains tabular metal particles is preferably in a range of 5 to 120 nm, more preferably in a range of 7 to 80 nm, particularly preferably in a range of 10 to 40 nm, and more particularly preferably in a range of 10 to 30 nm. In the infrared reflective patterned product of the present invention, when the thickness of the infrared reflective pattern portion is decreased, the reflectance in a wavelength (peak wavelength) with the highest reflectance in an infrared region of 780 nm to 2500 nm can be increased.

In the infrared reflective patterned product of the present invention, in a case where the coating film thickness d of the metal particle-containing layer and the average equivalent circle diameter D satisfy the relationship of "d>D/2", it is preferable that 80 number-percent of the tabular metal particles in a hexagonal to circular shape are present in a range of d/2 from the surface of the metal particle-containing layer, more preferable that 80 number-percent thereof are present in a range of d/3 from the surface of the metal particle-containing layer, and still more preferable that 60 number-percent of the tabular metal particles in a hexagonal to circular shape are exposed to one surface of the metal particle-containing layer. The expression "the tabular metal particles are present in a range of d/2 from the surface of the metal particle-containing layer" means that at least some of the tabular metal particles are included in a range of d/2 from the surface of the metal particle-containing layer. In other words, the tabular metal particles, shown in FIG. 6D, some of which are protruding from the surface of the metal particle-containing layer are also handled as the tabular metal particle present in a range of d/2 from the surface of the metal particle-containing layer. FIG. 6D shows that only some of the tabular metal particles in the thickness direction are buried in the metal particle-containing layer and does not indicate that each of the tabular metal particles is stacked on the surface of the metal particle-containing layer. FIGS. 6B to 6D are views schematically illustrating a case where the thickness d of the metal particle-containing layer satisfies "d>D/2", and particularly FIG. 6B shows that 80 number-percent or greater of the tabular metal particles are included in a range of f and f and d satisfy the relationship of "f<d/2".

In addition, the expression "the tabular metal particles are exposed to one surface of the metal particle-containing layer" means that surfaces of some tabular metal particles protrude from the surface of the metal particle-containing layer.

Here, the distribution of the tabular metal particle present in the metal particle-containing layer can be measured from images obtained by observing the cross section sample of the infrared reflective patterned product using SEM.

In the infrared reflective patterned product of the present invention, the coating film thickness d of the metal particle-containing layer and the average equivalent circle diameter D of metal particles satisfy the relationship of preferably "d<d/2", more preferably "d<d/4", and still more preferably "d<d/8". It is preferable that the coating film thickness of the metal particle-containing layer is decreased from the viewpoint that the angle of plane orientation of the tabular metal particles becomes easy to approach 0° so that the plasmon reflection effect from the tabular metal particles can be maximized. Further, it is preferable that the thickness of the metal particle-containing layer at coating is decreased from the viewpoint that variation of each tabular metal particle being arranged in the thickness direction is decreased and the tabular metal particles are easily arranged in the same in-plane height so that the plasmon reflection effect from the tabular metal particles can be maximized. FIGS. 6E and 6F are views schematically illustrating a case where the thickness d of the metal particle-containing layer satisfies "d<D/2".

In the infrared reflective patterned product of the present invention, as illustrated in FIG. 6B, it is preferable that the metal particle-containing layer 1 is present in a range of (Δ/n)/4 in the depth direction from the horizontal surface of the infrared reflective patterned product when a plasmon resonance wavelength of a metal constituting the tabular metal particles 11 in the metal particle-containing layer 1 is set to λ and a refractive index of a medium in the metal particle-containing layer 1 is set to n. When the relationship is satisfied, an effect of strengthening the amplitude of reflected waves due to the phase of the reflected waves on the interface of respective metal particle-containing layers on the upper side and the lower side of the infrared reflective patterned product is sufficiently increased and the visible light transmittance and the heat ray maximum reflectance become excellent.

The plasmon resonance wavelength λ of the metal constituting the tabular metal particles in the metal particle-containing layer is not particularly limited and can be suitably selected depending on the purpose thereof, but is preferably in a range of 400 nm to 2500 nm from the viewpoint of imparting heat ray reflection performance and more preferably in a range of 700 nm to 2500 nm from the viewpoint of imparting the visible light transmittance.

It is preferable that the plasmon resonance wavelength λ of the metal constituting the tabular metal particles of the present invention is the above-described reflection peak wavelength A (μm) of the tabular metal particles.

[1-2-5. Medium of Metal Particle-Containing Layer]

The medium in the metal particle-containing layer is not particularly limited and can be suitably selected depending on the purpose thereof. In the infrared reflective patterned product of the present invention, it is preferable that the metal particle-containing layer contains a polymer and more preferable that the metal particle-containing layer contains a transparent polymer. Examples of the polymer include polymers, for example, natural polymers such as a polyvinyl acetal resin, a polyvinyl alcohol resin, a polyvinyl butyral resin, a polyacrylate resin, a polymethyl methacrylate resin, a polycarbonate resin, a polyvinyl chloride resin, a (saturated) polyester resin, a polyurethane resin, gelatin, and cellulose. Among these, in the present invention, the main polymers of polymers are preferably a polyvinyl alcohol resin, a polyvinyl butyral resin, a polyvinyl chloride resin, a (saturated) polyester resin, and a polyurethane resin, more preferably a polyester resin and a polyurethane resin from the viewpoint that 80 number-percent of the tabular metal particles in a hexagonal to circular shape are easily set to be present in a range of d/2 from the surface of the metal particle-containing layer, and particularly preferably a polyester resin and a polyurethane resin from the viewpoint that the rubbing resistance of the infrared reflective patterned product of the present invention is further improved.

Among examples of the polyester resin, a saturated polyester resin is particularly preferable from the viewpoint that excellent weather resistance can be imparted because a double bond is not included. Further, it is more preferable that the molecule terminal has a hydroxyl group or a carboxyl group from the viewpoint of obtaining excellent hardness, durability, and heat resistance by performing curing using a water-soluble and water-dispersible curing agent or the like.

Commercially available polymers can be preferably used as the polymer and examples thereof include PLAS COAT Z-867 (manufactured by GOO CHEMICAL CO., LTD.) serving as a water-soluble polyester resin.

Further, in the present specification, the main polymer of polymers contained in the metal particle-containing layer indicates a polymer component occupying 50% by mass of the polymers contained in the metal particle-containing layer.

The content of the polyester resin and the polyurethane resin is preferably in a range of 1% to 10000% by mass, more preferably in a range of 10% to 1000% by mass, and particularly preferably in a range of 20% to 500% by mass with respect to the metal particles contained in the metal particle-containing layer. The physical characteristics such as rubbing resistance can be improved by setting a binder contained in the metal particle-containing layer to be in the above-described range.

The refractive index n of the medium is preferably in a range of 1.4 to 1.7.

In the infrared reflective patterned product of the present invention, in a case where 80 number percent or greater of the tabular metal particles in a hexagonal to circular shape are covered by the polymer when the thickness of the tabular metal particles in a hexagonal to circular shape is set to a, a/10 or greater in the thickness direction is covered by the polymer, more preferably in a range of a/10 to 10a in the thickness direction is covered by the polymer, and particularly preferably in a range of a/8 to 4a is covered by the polymer. When a predetermined proportion or greater of the tabular metal particles in a hexagonal to circular shape are buried by the metal particle-containing layer, the rubbing resistance can be further improved. In other words, the embodiment of FIG. 6C or 6E is preferable than the embodiment of FIG. 6D or 6F for the infrared reflective patterned product of the present invention.

[1-2-6. Density of Tabular Metal Particles in Pattern Portion (Area Ratio of Tabular Metal Particles)]

The density (area ratio) of tabular metal particles [(B/A)× 100] which is the proportion of a total value B of the area of tabular metal particles to an area A (a total projected area A of the metal particle-containing layer when seen from the vertical direction to the metal particle-containing layer) of the base material when the infrared reflective patterned product is seen from above is preferably 15% or greater, more preferably 20% or greater, and still more preferably 30% or greater.

Here, the area ratio can be measured by performing imaging processing on the image obtained by observing the infrared reflective patterned product from above using SEM or the image obtained by observing the infrared reflective patterned product from above using an atomic force microscope (AFM).

[1-2-7. Arrangement of Tabular Metal Particle]

It is preferable that the tabular metal particles are uniformly arranged in the metal particle-containing layer. The uniform arrangement here indicates that, when the distance (distance between closest particles) from each particle to the closest particle is digitized by the distance between centers of particles, the variation coefficient (=standard deviation÷average value) of the distance between closest particles of respective particles is small. It is preferable that the variation coefficient of the distance between closest particles becomes small, and the variation coefficient is preferably 30% or less, more preferably 20% or less, still more preferably 10% or less, and ideally 0%. It is not preferable that the variation coefficient of the distance between closest particles is large from the viewpoints that the tabular metal particles are coarsened or aggregated in the metal particle-containing layer and thus the haze is likely to deteriorate. The distance between closest particles can be measured by observing the coating surface of the metal particle-containing layer using SEM or the like.

[1-2-8. Layer Configuration of Metal Particle-Containing Layer]

In the infrared reflective patterned product of the present invention, tabular metal particles are arranged in the form of the metal particle-containing layer that contains tabular metal particles as illustrated in FIGS. 6A to 6F.

The metal particle-containing layer may be formed of a single layer or a plurality of metal particle-containing layers as illustrated in FIGS. 6A to 6F. In a case where the metal particle-containing layer is formed of a plurality of metal particle-containing layers, shielding performance in accordance with the wavelength band to be expected to impart heat shielding performance can be imparted. In a case where the metal particle-containing layer is formed of a single metal particle-containing layer, it is preferable that 80 number-percent or greater of the tabular metal particles in a hexagonal to circular shape are present in a range of d'/2 from the surface of the metal particle-containing layer on the outermost surface of the infrared reflective patterned product of the present invention when the thickness of the metal particle-containing layer on the outermost surface is set to d' in the metal particle-containing layer at least on the outermost surface.

Here, the thickness of each layer of the metal particle-containing layer can be measured by observing the cross section sample of the infrared reflective patterned product using SEM or observing the cross section slice sample using TEM.

Even in a case where another layer such as an overcoat layer described below or the like is present on the metal particle-containing layer of the infrared reflective patterned product, the interface between another layer and the metal particle-containing layer can be determined using the same method as described above and the thickness d of the metal particle-containing layer can be determined. Further, in a case where the metal particle-containing layer is coated with the same type of polymer as the polymer contained in the metal particle-containing layer, typically, the interface between the coated layer and the metal particle-containing layer can be determined using an image observed with SEM and the thickness d of the metal particle-containing layer can be determined.

[1-2-9. Method of Synthesizing Tabular Metal Particles]

A method of synthesizing tabular metal particles is not particularly limited and can be suitably selected depending on the purpose thereof. For example, the tabular metal particles in a hexagonal to circular shape can be synthesized using a liquid phase method such as a chemical reduction method, a photochemical reduction method, or an electrochemical reduction method. Among these, from the viewpoint of controllability of the shape and the size, a liquid phase method such as a chemical reduction method or a photochemical reduction method is particularly preferable. The tabular metal particles in a hexagonal to triangular shape may be obtained by performing an etching treatment using dissolution species of dissolving silver, such as nitric acid or sodium sulfite, an aging treatment through heating, and the like so that the angles of the tabular metal particles in a hexagonal to triangular shape become obtuse after the tabular metal particles in a hexagonal to circular shape are synthesized.

In addition to the method described above, tabular metal particles may be synthesized using a method of growing crystals of metal particles (for example, Ag) in a tabular shape after seed crystals are fixed to the surface of a transparent base material such as a film or glass in advance.

In the infrared reflective patterned product of the present invention, the tabular metal particles may be subjected to another treatment in order to impart desired characteristics. The another treatment is not particularly limited and can be suitably selected depending on the purpose thereof, and examples thereof include a treatment of forming a high refractive index shell layer and a treatment of adding various additives such as a dispersant or an antioxidant.

—1-2-9-1. Formation of High Refractive Index Shell Layer—

In order to further improve transparency in a visible light region, the tabular metal particles may be covered by a high refractive index material having high transparency in a visible light region.

The high refractive index material is not particularly limited and can be suitably selected, and examples thereof include $TiO_x$, $BaTiO_3$, $ZnO$, $SnO_2$, $ZrO_2$, and $NbO_x$.

A method of covering tabular metal particles is not particularly limited and can be suitably selected depending on the purpose thereof. For example, a method of forming a $TiO_X$ layer on the surface of tabular metal particles of silver by hydrolyzing tetrabutoxy titanium as reported in Langmuir, 2000, Vol. 16, pp. 2731 to 2735 may be used.

In a case where it is difficult to form a high refractive index metal oxide layer shell directly on the tabular metal particles, a shell layer of $SiO_2$ or a polymer is formed after the tabular metal particles are synthesized in the above-described manner and then a metal oxide layer may be formed on the shell layer. In a case where $TiO_x$ is used as a material of the high refractive index metal oxide layer, there is a concern that a matrix that disperses tabular metal particles may be deteriorated due to photocatalytic activity of $TiO_x$. Therefore, a $SiO_2$ layer may be suitably formed after a $TiO_x$ layer is formed on the tabular metal particles according to the purpose thereof.

—1-2-9-2. Addition of Various Additives—

In the infrared reflective patterned product of the present invention, in a case where the metal particle-containing layer contains polymers and the main polymer of the polymers is a polyester resin, it is preferable that a crosslinking agent is added from the viewpoint of film strength.

Further, in the infrared reflective patterned product of the present invention, in a case where the metal particle-containing layer contains polymers, it is preferable that a surfactant is added from the viewpoints of suppressing occurrence of cissing and obtaining an excellent planar layer.

As the crosslinking agent or the surfactant, materials described in paragraph [0066] of JP2014-194446A can be used and the description of this publication is incorporated in the present specification.

In order to prevent oxidation of a metal such as silver constituting tabular metal particles, the tabular metal particles may adsorb an antioxidant such as mercaptotetrazole or ascorbic acid. Further, for the purpose of preventing oxidation, an oxidation sacrificial layer such as Ni may be formed on the surface of the tabular metal particles. In addition, for the purpose of blocking oxygen, the tabular metal particles may be covered by a metal oxide film such as $SiO_2$.

For the purpose of imparting dispersibility, a dispersant such as a low molecular weight dispersant or a high molecular weight dispersant containing at least one of an N element, an S element, or a P element such as quaternary salts or amines may be added to the tabular metal particles.

Preservative:

It is preferable that a tabular metal particle dispersion liquid contains a preservative at the time of preparing the infrared reflective patterned product of the present invention from the viewpoints of maintaining heat shielding performance and improving the visible light transmittance. As the functions and examples of the preservative, the description in paragraphs [0073] to [0090] of JP2014-184688A can be referred to and the description of this publication is incorporated in the present specification.

Antifoaming Agent

In the present invention, it is preferable to use an antifoaming agent during the process of preparation or re-dispersion of tabular metal particles. As the functions and examples of the antifoaming agent, the description in paragraphs [0091] and [0092] of JP2014-184688A can be referred to and the description of this publication is incorporated in the present specification.

—2. Uneven Structure—

In the infrared reflective patterned product of the present invention, the infrared reflective pattern portion has an uneven structure that includes a plurality of protruding portions and/or recessed portion and at least one type of metal particles are contained on at least one surface from among the protruding portions and recessed portions of the uneven structure of the infrared reflective pattern portion.

As illustrated in FIGS. 1, 2, and 18, both of the non-pattern portion 52 and the infrared reflective pattern portion 51 may have the uneven structure. As illustrated in FIG. 19, the non-pattern portion 52 that specular-reflects (obliquely incident) infrared rays does not have the uneven structure and only the pattern portion 51 that reflects obliquely incident infrared rays in an infrared irradiation direction may have the uneven structure.

In regard to the uneven structure, the support may have the uneven structure and other members may have the uneven structure. Among these, it is preferable that the support has the uneven structure.

The uneven structure may include only a plurality of protruding portions, only a plurality of recessed portions, or a plurality of protruding portions and recessed portions. As the uneven structure including only a plurality of protruding portions, a structure including protruding portions in a hemispherical shape may be exemplified. As the uneven structure including a plurality of protruding portions and recessed portions, an uneven structure in a prism shape, a pyramidal prism shape, or a corner cube shape may be exemplified.

In the infrared reflective patterned product of the present invention, it is preferable that the uneven structure is in a prism shape, a pyramidal prism shape, a hemispherical shape, or a corner cube shape.

It is more preferable that the uneven structure includes a plurality of protruding portions and recessed portions, particularly preferable that the uneven structure is in a prism shape, a pyramidal prism shape, or a corner cube shape, and more particularly preferable that the uneven structure is in a corner cube shape.

In the present specification, the corner cube shape indicates a shape obtained by combining three planes so as to be orthogonal to each other, but the concept thereof include a shape deformed, within the optically acceptable range, from the shape obtained by combining three planes so as to be orthogonal to each other. Since it is difficult to make an infrared irradiation unit and a photodetector completely and optically match each other, it is preferable to deform the shape such that reflected light easily enters rather than to completely perform retroreflection.

It is preferable that the uneven structure has at least one of protruding portions or recessed portions at a periodic pitch.

In a case of a protruding portion, the size of a protruding portion or a recessed portion indicates the distance between the lowest points when the protruding portion is cut in a plane passing through the highest point and the lowest point of the protruding portion perpendicular to the support. In a case of a recessed portion, the size of a protruding portion or a recessed portion indicates the distance between the highest points when the recessed portion is cut in a plane passing through the highest point and the lowest point of the recessed portion perpendicular to the support. In a case where the size of each pitch varies, the size indicates the average value of distances between the lowest points or highest points. In a case where the pitch is a protruding portion, the size indicates the distance between the highest points. Further, in a case where the pitch is a recessed portion, the size indicates the distance between the lowest points. The size of the uneven structure is preferably in a range of 1 μm to 100 μm.

Figure 12:
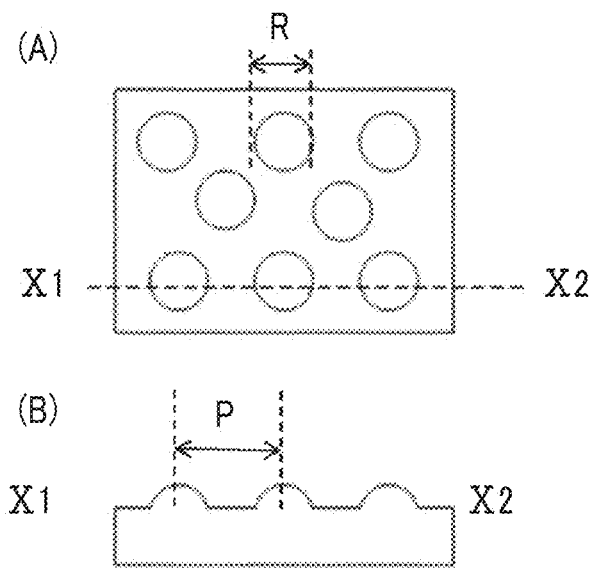
FIG. 12 is a view schematically illustrating an uneven structure in a hemispherical shape which is an example of the uneven structure of the infrared reflective patterned product of the present invention.

In a case where the uneven structure is in a hemispherical shape illustrated in FIG. 12, each pitch corresponds to P of FIG. 12 and the size of a protruding portion or a recessed portion corresponds to R in FIG. 12. In the case where the uneven structure is in a hemispherical shape, the pitch and the size of a protruding portion or a recessed portion may not match each other and it is preferable that the pitch and the size of a protruding portion or a recessed portion are close to each other.

Figure 13:
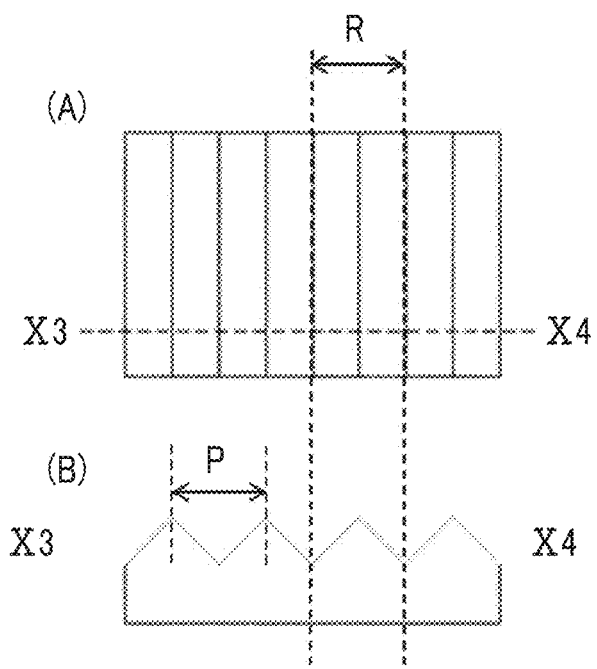
FIG. 13 is a view schematically illustrating an uneven structure in a prism shape which is an example of the uneven structure of the infrared reflective patterned product of the present invention.

In a case where the uneven structure is in a prism shape illustrated in FIG. 13, each pitch corresponds to P of FIG. 13 and the size of a protruding portion or a recessed portion corresponds to R in FIG. 13. In the case where the uneven structure is in a prism shape, it is preferable that the pitch and the size of a protruding portion or a recessed portion match each other.

Figure 14:
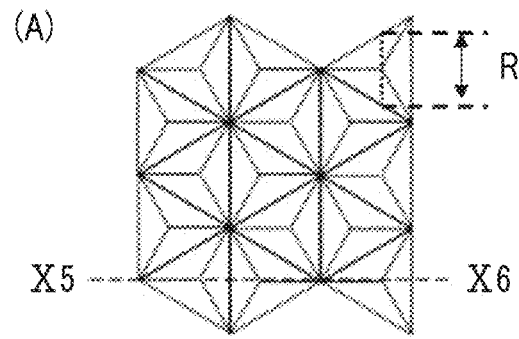
FIG. 14 is a view schematically illustrating an uneven structure in a corner cube shape which is an example of the uneven structure of the infrared reflective patterned product of the present invention.
Figure 14:
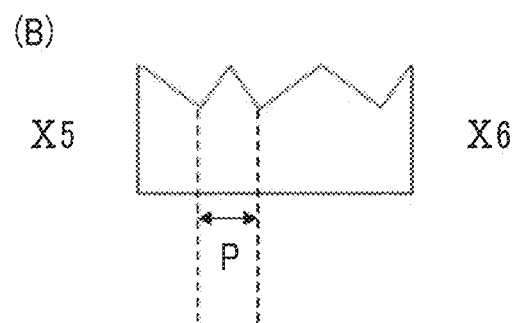

In a case where the uneven structure is in a corner cube shape illustrated in FIG. 14, each pitch corresponds to P of FIG. 14 and the size of a protruding portion or a recessed portion corresponds to R in FIG. 14. In the case where the uneven structure is in a prism corner cube shape, the pitch and the size of a protruding portion or a recessed portion may not match each other and it is preferable that the pitch and the size of a protruding portion or a recessed portion are close to each other.

Figure 15:
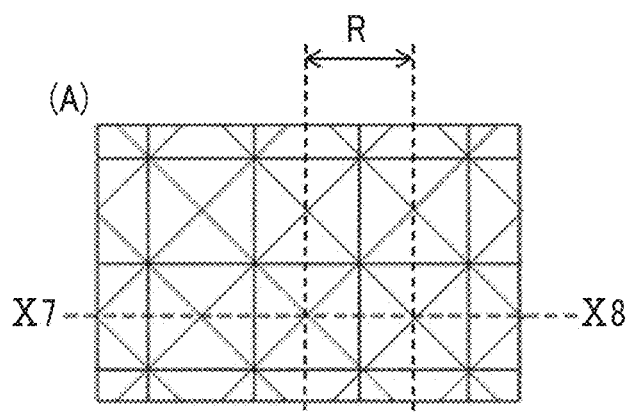
FIG. 15 is a view schematically illustrating an uneven structure in a pyramid type prism shape which is an example of the uneven structure of the infrared reflective patterned product of the present invention.
Figure 15:
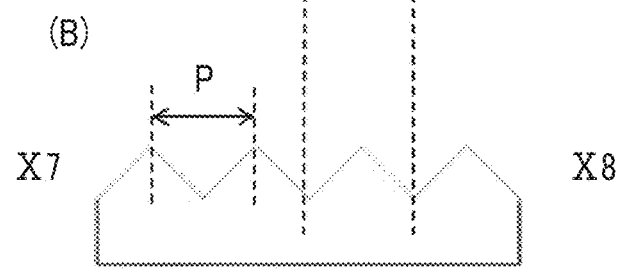

In a case where the uneven structure is in a pyramidal prism shape illustrated in FIG. 15, each pitch corresponds to P of FIG. 15 and the size of a protruding portion or a recessed portion corresponds to R in FIG. 15. In the case where the uneven structure is in a pyramidal prism shape, it is preferable that the pitch and the size of a protruding portion or a recessed portion match each other.

It is preferable that the size of a protruding portion or a recessed portion is sufficiently greater than the diameter of the tabular metal particle. The ratio between the size of a protruding portion or a recessed portion and the diameter of the tabular metal particle is preferably in a range of 5 times to 500 times, more preferably in a range of 10 times to 300 times, and particularly preferably in a range of 25 times to 250 times. It is preferable that the ratio between the size of a protruding portion or a recessed portion and the diameter of the tabular metal particle is greater than or equal to the above-described lower limit from the viewpoint that the reflectance of infrared rays is increased. It is preferable that the ratio between the size of a protruding portion or a recessed portion and the diameter of the tabular metal particle is less than or equal to the above-described upper limit from the viewpoint that the size of a protruding portion or a recessed portion is decreased and thus the film thickness becomes small.

The pattern size of the infrared reflective pattern portion containing an infrared reflective material indicates a diameter when assuming a circle having the same area as the area of one pattern or an average value of diameters in a case where the area of each pattern varies.

It is preferable that the pattern size is sufficiently greater than the size of a protruding portion or a recessed portion. The ratio between the pattern size and the size of a protruding portion or a recessed portion is preferably in a range of 2 times to 100 times and more preferably in a range of 5 times to 50 times. It is preferable that the ratio between the pattern size and the size of a protruding portion or a recessed portion is greater than or equal to the above-described lower limit from the viewpoint that the pattern shape is easily recognized. It is preferable that the ratio between the pattern size and the size of a protruding portion or a recessed portion is less than or equal to the above-described upper limit from the viewpoint that the reflectance of infrared rays is increased.

<Non-Pattern Portion>

It is preferable that the infrared reflective patterned product of the present invention includes a non-pattern portion in a region constituting at least a part of a region of the support on which the pattern portion is not formed.

It is more preferable that the non-pattern portion includes an infrared absorbing material and absorbs infrared rays.

It is preferable that the infrared absorbing material forms a layer.

The layer containing the infrared absorbing material may be formed of one layer or two or more layers.

Examples of the infrared absorbing material include carbon ink, ink containing inorganic ions (metals such as copper, iron, and ytterbium), an organic dye such as a phthalocyanine dye, a dithiol compound dye, a squalium dye, a croconium dye, or a nickel complex dye, a known infrared absorbing dye such as diimmonium dye or a cyanine dye, a layer in which tabular metal particles which are plane-oriented so that an angle between a principal plane of the tabular metal particle in a hexagonal to circular shape and a surface of the uneven structure closest to the tabular metal particle is in a range of 0° to ±30° are adjusted to be less than 50 number-percent, and inorganic particles such as cadmium tungstate (CWO) and tin-doped indium oxide (ITO).

It is preferable that the material absorbing infrared rays have absorption peaks in a wavelength region of 780 to 950 nm.

Among these, a known infrared absorbing dye such as diimmonium dye and a layer in which tabular metal particles which are plane-oriented so that an angle between a principal plane of the tabular metal particle in a hexagonal to circular shape and a surface of the uneven structure closest to the tabular metal particle is in a range of 0° to ±30° are adjusted to be less than 50 number-percent are preferable, a known infrared absorbing dye such as diimmonium dye is more preferable, and a diimmonium dye is particularly preferable.

Examples of the known infrared absorbing dye include phthalocyanine, cyanine, diimmonium, quaterrylene, a dithiol Ni complex, indoaniline, an azomethine complex, aminoanthraquinone, naphthalocyanine, oxonol, squarylium, and a croconium dye. Specific examples thereof include dyes having absorption maximum wavelengths (in other words from a different viewpoint, maximum absorption wavelengths) in the above-described wavelength region described in "Chemical Reviews" published in 1992, Vol. 92, No. 6, pp. 1197 to 1226, "Absorption Spectra Of Dyes for Diode Lasers JOEM Handbook 2) (bunshin-publishing, published in 1990), and "Development of Infrared Absorbing Dye for Optical Disk" Fine Chemical Vol. 23, No. 3, published in 1999.

Specific examples thereof include a diimmonium dye described in paragraphs [0072] to [0115] of JP2008-069260, a cyanine dye described in paragraphs [0020] to [0051] of JP2009-108267A, and a phthalocyanine dye described in paragraphs [0010] to [0019] of JP2013-182028. The contents of these publications are incorporated in the present invention.

Among these, from the viewpoint of solidity, a diimmonium dye is preferable.

Commercially available infrared absorbing dyes can be preferably used as the known infrared absorbing dye. Examples of the commercially available dyes of the diimmonium dye include N,N,N,N-tetrakis (para-dibutylaminophenyl) 1,4-benzeneiminium ditetraoxychlorate (KAYASORB IRG-023, manufactured by Nippon Kayaku Co., Ltd.).

A case where the infrared absorbing material is a layer in which tabular metal particles which are plane-oriented so that an angle between a principal plane of the tabular metal particle in a hexagonal to circular shape and a surface of the uneven structure closest to the tabular metal particle is in a range of 0° to ±30° are adjusted to be less than 50 number-percent will be described.

In the non-pattern portion, the layer in which tabular metal particles which are plane-oriented so that an angle between a principal plane of the tabular metal particle in a hexagonal to circular shape and a surface of the uneven structure closest to the tabular metal particle is in a range of 0° to ±30° are adjusted to be less than 50 number-percent is more preferably a layer in which tabular metal particles which are plane-oriented so that an angle between a principal plane of the tabular metal particle in a hexagonal to circular shape and a surface of the uneven structure closest to the tabular metal particle is in a range of 0 to ±30° are adjusted to be less than 40 number-percent and particularly preferably a layer in which tabular metal particles which are plane-oriented so that an angle between a principal plane of the tabular metal particle in a hexagonal to circular shape and a surface of the uneven structure closest to the tabular metal particle is in a range of 0° to ±30° are adjusted to be less than 35 number-percent.

The layer in which tabular metal particles which are plane-oriented so that an angle between a principal plane of the tabular metal particle in a hexagonal to circular shape and a surface of the uneven structure closest to the tabular metal particle is in a range of 0° to ±30° are adjusted to be less than 50 number-percent can be formed by disturbing the arrangement of the tabular metal particles after a layer in which tabular metal particles which are plane-oriented so that an angle between a principal plane of the tabular metal particle used for the infrared reflective pattern portion in a hexagonal to circular shape and a surface of the uneven structure closest to the tabular metal particle is in a range of 0° to ±30° are adjusted to be 50 number-percent or greater is formed.

As a method of disturbing the arrangement of the tabular metal particles, a method of printing a coating solution (containing an ink-jet solution) that disturbs the arrangement of the tabular metal particles according to an arbitrary method for patterning may be used and it is preferable that the printing is performed using an ink-jet method. The coating solution that disturbs the arrangement of the tabular metal particles contains preferably a polymer and more preferably a transparent polymer. Examples of the polymer include polymers, for example, natural polymers such as a polyvinyl acetal resin, a polyvinyl alcohol resin, a polyvinyl butyral resin, a polyacrylate resin, a polymethyl methacrylate resin, a polycarbonate resin, a polyvinyl chloride resin, a (saturated) polyester resin, a polyurethane resin, gelatin, and cellulose. Among these, in the present invention, a coating solution containing gelatin is exemplified and can be prepared by simultaneously performing swelling and dissolving gelatin through heating so as to be completely dissolved.

In addition, the preferable range of the tabular metal particles used for the infrared reflective pattern portion can be suitably employed as the preferable range of the layer in which tabular metal particles which are plane-oriented so that an angle between a principal plane of the tabular metal particle in a hexagonal to circular shape and a surface of the uneven structure closest to the tabular metal particle is in a range of 0° to ±30° are adjusted to be less than 50 number-percent.

<Support>

The infrared reflective patterned product of the present invention includes a support.

The support is not particularly limited and a known support can be used.

The shape, structure, size, or material of the support is not particularly limited and suitably selected depending on the purpose thereof. As the shape of the support, a tabular shape may be exemplified. The support may have a single layer structure or a lamination structure.

The size of the support can be suitably selected depending on the size of the infrared reflective patterned product or the like.

As the support, a support having a high visible light transmissivity is preferable and the support which is transparent is more preferable.

Further, a support having low haze is also preferable.

In addition, from the viewpoint of formability, it is preferable that Tg is small. The Tg of the support is preferably in a range of 30° C. to 200° C. and more preferably in a range of 60° C. to 170° C. Further, from the viewpoint of formability, it is preferable that the high visible light transmissivity and low haze are maintained even when the temperature is higher than Tg.

The material of the support is not particularly limited and can be suitably selected depending on the purpose thereof, and examples thereof include films containing a polyolefin resin such as a cycloolefine polymer (also referred to as COP), a cycloolefine copolymer (also referred to as COC), polyethylene, polypropylene, poly 4-methylpentene-1, or polybutene-1; a polyester resin such as polyethylene terephthalate or polyethylene naphthalate; a polycarbonate resin; a polyvinyl chloride resin; a polyphenylene sulfide resin; a polyether sulfone resin; a polyethylene sulfide resin; a polyphenylene ether resin; a styrene resin; an acrylic resin, a polyamide resin; a polyimide resin; and a cellulose resin such as triacetyl cellulose or cellulose acetate; and laminated films of these. An optimum material can be used as necessary. Among these, from the viewpoints of the formability, the high visible light transmissivity, and low haze, an acryl film, a COP film, and a polyethylene terephthalate film are particularly preferable.

The thickness of the support is not particularly limited and can be suitably selected depending on the purpose of using the infrared reflective patterned product. The thickness thereof is typically in a range of 10 µm to 500 µm, but the thickness thereof is preferably small from the viewpoint of the request for reducing the film thickness and the thickness is preferably large from the viewpoint of formability. The thickness of the support is preferably in a range of 10 µm to 100 µm, more preferably in a range of 20 µm to 300 µm, and particularly preferably in a range of 35 µm to 280 µm. When the thickness of the support is sufficiently large, there is a tendency that adhesion failure is unlikely to occur. Further, when the thickness of the support is sufficiently small, holes are easily made at the time of formation.

<Other Layers and Components>

<<Pressure Sensitive Adhesive Layer or Adhesive Layer>>

It is preferable that the infrared reflective patterned product of the present invention includes a pressure sensitive adhesive layer or an adhesive layer. The pressure sensitive adhesive layer may contain an ultraviolet absorbing agent.

The material which can be used for forming the pressure sensitive adhesive layer is not particularly limited and can be suitably selected depending on the purpose thereof, and examples thereof include a polyvinyl butyral (PVB) resin, an acrylic resin, a styrene/acrylic resin, a urethane resin, a polyester resin, and a silicone resin. These may be used alone or in combination of two or more kinds thereof. The pressure sensitive adhesive layer formed of these materials can be formed by coating.

In addition, an antistatic agent, a lubricant, a blocking agent, or the like may be added to the pressure sensitive adhesive layer.

The thickness of the pressure sensitive adhesive layer is preferably in a range of 0.1 µm to 10 µm.

<<Hard Coat Layer>>

In order to impart scratch resistance, it is desirable that the infrared reflective patterned product of the present includes a hard coat layer in which a functional film has hard coat properties. The hard coat layer may contain metal oxide particles.

As the hard coat layer, the description in paragraph [0144] of JP2014-184688A can be referred to and the description of this publication is incorporated in the present specification.

<<Overcoat Layer>>

In the infrared reflective patterned product of the present invention, it is preferable that a surface side where the infrared reflective pattern portion of the support includes an overcoat layer that fills the uneven structure from the viewpoint of reducing the haze.

In order to prevent oxidation and sulfuration of the tabular metal particles due to mass transfer and impart scratch resistance, the infrared reflective patterned product of the present invention may include an overcoat layer in close contact with the surface of the metal particle-containing layer on a side where the tabular metal particles in a hexagonal to circular shape are exposed. In addition, an overcoat layer may be present between the metal particle-containing layer and the ultraviolet absorbing layer. Particularly, in a case where the tabular metal particles are unevenly distributed in the surface of the metal particle-containing layer, the infrared reflective patterned product of the present invention may include an overcoat layer in order to prevent contamination of the production process resulting from peeling off of the tabular metal particles or prevent the arrangement of tabular metal particles from being disturbed at the time of application of another layer.

The overcoat layer may contain an ultraviolet absorbing agent. The overcoat layer is not particularly limited and can be suitably selected depending on the purpose thereof. For example, the overcoat layer is formed by containing a binder, a matting agent, a low refractive index filler such as hollow silica or hollow magnesium fluoride, a surfactant, and other components as necessary. It is more preferable that the overcoat layer contains the low refractive index filler from the viewpoints that the visible light reflectance of the pattern portion and the non-pattern portion is decreased, the visible light transmittance is increased, and the infrared reflective patterned product of the present invention can be mounted on the front surface of a display. The binder is not particularly limited and can be suitably selected depending on the purpose thereof, and examples thereof include thermosetting type or photocurable type resins such as an acrylic resin, a silicone resin, a melamine resin, a urethane resin, an alkyd resin, and a fluorine resin. The thickness of the overcoat layer is preferably in a range of 0.01 µm to 1000 µm, more preferably in a range of 0.02 µm to 500 µm, and particularly preferably in a range of 0.03 µm to 10 µm.

In the infrared reflective patterned product of the present invention, a difference in refractive index between the overcoat layer and the support is preferably 0.05 or less, more preferably 0.02 or less, and particularly preferably 0.01 or less.

In the infrared reflective patterned product of the present invention, it is preferable that the overcoat layer is transparent and more preferable that the support and the overcoat layer are transparent.

<<Back Coat Layer>>

The infrared reflective patterned product of the present invention may include a back coat layer on a surface side opposite to the metal particle-containing layer of the support. The back coat layer is not particularly limited and can be suitably selected depending on the purpose thereof. Further, the preferable composition and thickness thereof are the same as the preferable composition and thickness of the overcoat layer.

<<Ultraviolet Absorbing Agent>>

It is preferable that the infrared reflective patterned product of the present invention includes a layer containing an ultraviolet absorbing agent.

As the layer containing the ultraviolet absorbing agent, the description in paragraphs [0148] to [0155] of JP2014-184688A can be referred to and the description of this publication is incorporated in the present specification.

<<Refractive Index Layer for Adjusting Reflection of Metal Particles>>

It is preferable that the infrared reflective patterned product of the present invention is improved such that the metal particle-containing layer becomes more inconspicuous by providing one or two or more refractive index layers for adjusting reflection of metal particles. For example, an embodiment in which the metal particle-containing layer is present on one surface of the support and the low refractive index layer is present on a surface side opposite to the surface provided with the metal particle-containing layer of the support may be exemplified. Further, in this embodiment, a refractive index layer for adjusting reflection of second metal particles may be present between the support and the metal particle-containing layer. In addition, an embodiment in which the support, the refractive index layer for adjusting reflection of second metal particles, a refractive index layer for adjusting reflection of third metal particles, and the metal particle-containing layer are laminated in order may be employed.

When the infrared reflective patterned product includes a refractive index layer for adjusting reflection metal particles, the visible light reflectance is increased.

As the material constituting the refractive index layer for adjusting reflection of metal particles of the present invention, materials described in paragraph [0065] of JP2014-191224A can be used and the description of this publication is incorporated in the present specification.

The thickness of the refractive index layer for adjusting reflection of metal particles is preferably 20 nm or greater, more preferably 30 nm or greater, and still more preferably 40 nm or greater. The upper limit thereof is not particularly limited, but is practically 1000 nm.

In a case where the refractive index layer for adjusting reflection of metal particles is formed of two or more layers, it is preferable that the total thickness of each layer is in the above-described range.

As other configurations of the refractive index layer for adjusting reflection of metal particles, the configurations of an undercoat layer described in paragraphs [0066] to [0075] of JP2014-191224A can be referred to and the description of this publication is incorporated in the present specification.

<Method of Producing Infrared Reflective Patterned Product>

A method of producing the infrared reflective patterned product of the present invention is not particularly limited and can be suitably selected depending on the purpose thereof. First, a method of producing the metal particle-containing layer of the infrared reflective patterned product of the present invention will be described.

—1. Method of Forming Metal Particle-Containing Layer—

The metal particle-containing layer of the infrared reflective patterned product of the present invention may be patterned so as to include both of the infrared reflective pattern portion and the non-pattern portion or may be patterned so as to include only the infrared reflective pattern portion. Such patterning may be formed by photolithography using a photoresist. Examples of other methods of forming the pattern portion of the metal particle-containing layer include various printing means such as an ink-jet printing method, a screen printing method, and a gravure printing method. Among these, from the viewpoints of continuity and production cost, an ink-jet printing method is preferable.

Examples of a method of producing the infrared reflective pattern portion and the non-pattern portion of the infrared reflective patterned product of the present invention includes a method of coating a surface of an underlying layer of the support or the like with a dispersion liquid containing tabular metal particles in a hexagonal to circular shape using a dip coater, a die coater, a slit coater, a bar coater, or a gravure coater and a method of carrying out plane orientation using an LB film method, a self-organization method, or a spray coating method. Further, a combination with a method of patterning the metal particle-containing layer, which is not patterned, formed in the above-described manner according to a photolithography method is also exemplified. It is preferable that the metal particle-containing layer is formed by various printing means and coating. In a case where the metal particle-containing layer which is not patterned is formed using a dispersion liquid containing tabular metal particles in a hexagonal to circular shape, among the methods described above, a coating method using a bar coater is preferable.

In a case where the metal particle-containing layer is formed by coating, other additives such as a solvent and a surfactant may be added to a coating solution in addition to the tabular metal particles in a hexagonal to circular shape and the above-described polymers.

The above-described solvent is not particularly limited and water or a known organic solvent can be used. Examples thereof include various solvents such as water, toluene, xylene, methyl ethyl ketone, methyl isobutyl ketone, acetone, methyl alcohol, N-propyl alcohol, 1-propyl alcohol, propylene glycol monomethyl ether, propylene glycol monomethyl ether acetate, cyclohexanone, cyclohexanol, ethyl lactate, methyl lactate, and caprolactam. In the present invention, from the viewpoints of environmental impact and reduction in coating cost, it is preferable to use an aqueous solvent.

The above-described solvent may be used alone or in combination of two or more kinds thereof. In the present invention, specifically, it is more preferable that an aqueous solvent obtained by combining water and methanol is used.

Examples of other additives include surfactants and additives described in paragraphs [0027] to [0031] of JP2005-17322A.

The above-described surfactants are not particularly limited and examples thereof include aliphatic surfactants, aromatic surfactants, fluorine-based surfactants, non-ionic surfactants, anionic surfactants, and cationic surfactants. As the above-described surfactants, surfactants described in JP2011-218807A may be exemplified.

Specifically, RAPISOL A-90 (manufactured by NOF Corporation) and NAROACTY CL95 (manufactured by Sanyo Chemical Industries, Ltd.) are preferably used as the above-described surfactants.

The above-described surfactants may be used in combination of two or more kinds thereof except that the surfactants are used alone.

In a case where the metal particle-containing layer is formed by coating, the preferable ranges of the coating amount of tabular metal particles in a hexagonal to circular shape and the coating amount of polymers are respectively the same as the preferable ranges of the content of tabular metal particles in a hexagonal to circular shape and the content of the above-described polymers respectively contained in the metal particle-containing layer.

In the case where the metal particle-containing layer is formed by coating, it is preferable that a metal particle-containing layer is formed by applying the coating solution, drying the coated film using a known method, and solidifying the dried film. As the drying method, a method of performing drying through heating is preferable.

In order to promote plane orientation, the plane orientation may be promoted by passing a pressure roller such as a calender roller or a laminating roller after application of the tabular metal particles.

Further, in formation of the metal particle-containing layer using photolithography, both of a negative method and a positive method can be performed, but a positive method is more preferable from the viewpoint that unevenness in thickness or deterioration of the coated surface is unlikely to occur depending on a difference in level between pattern portions at the time of imparting an overcoat layer (protective layer).

The method of patterning the metal particle-containing layer which is not patterned according to a photolithography method is not particularly limited and a known method can be used. For example, a method described in paragraphs [0078] to [0093] of JP2013-201005A can be employed in the present invention and the contents described in this publication are incorporated in the present invention.

—2. Method of Forming Uneven Structure—

A method of forming an uneven structure on the pattern portion is not particularly limited.

For example, it is preferable that a frame in a shape of an uneven structure having protruding portions with a desired size and recessed portions with a desired size is applied in a state in which the metal particle-containing layer is present on the support and the uneven structure is provided by at least one of heating or pressing, from the viewpoint of maintaining plane orientation of tabular metal particles and more preferable that the uneven structure is provided by heating and pressing (hot pressing).

The conditions for heating and pressing are not particularly limited and can be changed depending on the shape, the structure, the material, the thickness, and the like of the support. The heating temperature is preferably in a range of 80° to 200° C. and more preferably in a range of 120° C. to 160° C. The pressing pressure is preferably in a range of 1 to 100 MPa and more preferably in a range of 5 to 15 MPa.

The method of forming an uneven structure on the pattern portion is not limited to the above-described method, and the uneven structure may be formed on the pattern portion using other known methods. The uneven structure may be provided before the metal particle-containing layer is provided on the support. The uneven structure may be provided using a method other than heating and pressing.

—3. Method of Forming Overcoat Layer—

It is preferable that an overcoat layer is formed by coating. The coating method at this time is not particularly limited and a known method can be sued. For example, a method of applying the dispersion liquid containing an ultraviolet absorbing agent using a dip coater, a die coater, a slit coater, a bar coater, or a gravure coater is exemplified.

—4. Method of Forming Pressure Sensitive Adhesive Layer or Adhesive Layer—

It is preferable that the pressure sensitive adhesive layer or the adhesive layer is formed by coating. For example, the layer can be laminated on the surface side opposite to the surface provided with the pattern portion of the support. The coating method at this time is not particularly limited and a known method can be used.

A pressure sensitive adhesive layer in a dry condition can be laminated by preparing a film, obtained by coating a release film coated with a pressure sensitive adhesive material or an adhesive layer in advance and then drying the film, and laminating the pressure sensitive adhesive material of this film or the surface of the adhesive layer and the surface of the infrared reflective patterned product of the present invention on each other. The lamination method at this time is not particularly limited and a known method can be used.

<Applications of Infrared Reflective Patterned Product>

The applications of the infrared reflective patterned product of the present invention are not particularly limited and the infrared reflective patterned product can be used for a system utilizing a known infrared reflective patterned product.

As the applications of the optical member of the present invention, the applications described in paragraphs [0021] to [0032] of JP2008-108236A may be exemplified and the contents described in this publication are incorporated in the present invention. For example, the optical member of the present invention can be used as an optical member for directly handwriting on a display device using a pen or the like to input data.

Particularly, an optical member having wavelength selective reflection units (for example, dots) in a pattern shape can be used as, for example, an input sheet used in a system utilizing an electronic pen that digitizes handwritten information and inputs the information to an information processing device.

The optical member can be used as an input sheet on a surface of a display such as a liquid crystal display. At this time, it is preferable that the optical member is transparent. The optical member is bonded to the display surface directly or through another film so that the optical member may be integrated with the display or, for example, detachably mounted on the display surface.

As the system utilizing an electronic pen that digitizes handwritten information and inputs the information to an information processing device, JP2014-98943A, JP2008-165385A, JP2008-108236A, and JP2008-077451 A can be referred to.

It is preferable that the infrared reflective patterned product of the present invention is a sheet to be mounted on the surface or on the front of a display device capable of displaying an image. As a preferred embodiment of a sheet to be mounted on the surface or on the front of a display device capable of displaying an image, an embodiment described in paragraphs [0024] to [0031] of JP4725417 may be exemplified.

Figure 4:
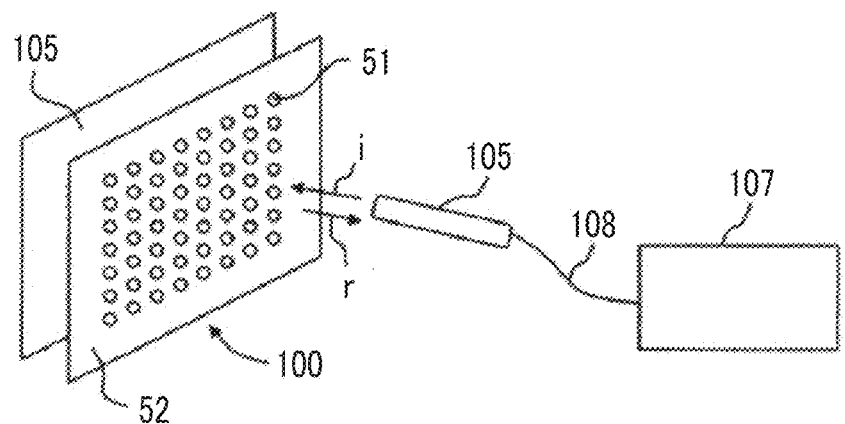
FIG. 4 is a view schematically illustrating a system of using an infrared reflective patterned product of the present invention as a sheet mounted on the surface or on the front of a display device capable of displaying an image.

FIG. 4 is a view schematically illustrating a system in which the infrared reflective patterned product of the present invention is used as a sheet to be mounted on the surface or on the front of a display device capable of displaying an image is used.

In FIG. 4, a sensor is not particularly limited as long as the sensor emits infrared rays i and is capable of sensing reflected light r of the pattern and a known sensor can be used. Examples of a pen type input terminal 106 provided with a read data processing device 107 include a pen point which does not include ink or graphite, a CMOS camera which does not include an infrared irradiation unit, a processor, a memory, a communication interface, for example, a wireless transceiver using a Bluetooth (registered trademark) technology or the like, and a device provided with a built-in battery, disclosed in JP2003-256137A As the operation of the pen type input terminal 106, for example, when a pen point is brought into contact with the front surface of the infrared reflective patterned product 100 of the present invention and draws so as to trace the surface, the pen type input terminal 106 detects the pen pressure applied to the pen point, a CMOS camera is operated, and the patterned is imaged (imaging of the pattern is performed 10 to 100 times for 1 second) while a predetermined range in the vicinity of the pen point is irradiated with infrared rays having a predetermined wavelength which are emitted from the infrared irradiation unit. In a case where the pen type input terminal 106 is provided with the read data processing device 107, the input trajectory accompanied by the movement of the pen point at the time of handwriting is digitized and converted into data to generate input trajectory data by analyzing the imaged pattern with a processor, and then the input trajectory data is transmitted to an information processing device.

Moreover, a processor, a memory, a communication interface, for example, a wireless transceiver using a Bluetooth (registered trademark) technology or the like, and a member such as a battery may be present outside the pen type input terminal 106 as the read data processing device 107 as illustrated in FIG. 4. In this case, the pen type input terminal 106 may be connected to the read data processing device 107 through a code 108 or read data may be transmitted in a wireless manner using radio waves or infrared rays.

In addition, as the input terminal 106, a reader described in JP2001-243006A may be used.

The read data processing device 107 which can be applied in the present invention is not particularly limited as long as the device has a function of calculating position information from continuous imaging data read by the input terminal 106, combining the position information with time information, and providing the combined information as input trajectory data handled by an information processing device and may include members such as a processor, a memory, a communication interface, and a battery.

In addition, the read data processing device 107 may be incorporated in an input terminal 106 described in JP2003-256137A or in an information processing device that includes a display device. Further, the read data processing device 107 may transmit position information to the information processing device that includes a display device in a wireless manner or may transmit position information in a wired manner by being connected to the information processing device that includes a display device through a code or the like.

The information processing device connected to the display device 105 is capable of displaying the trajectory which is handwritten and input by the input terminal 106 on a display device as if written on paper using a pen by sequentially updating an image displayed on the display device 105 based on the trajectory information transmitted from the read data processing device 107.

An image display device formed by the infrared reflective patterned product of the present invention being mounted on the image display surface or on the front of the image display surface of the image display device and a system including an image display device formed by the infrared reflective patterned product of the present invention being mounted on the image display surface or on the front of the image display surface of the image display device are incorporated in the invention disclosed in the present specification.

EXAMPLES

Hereinafter, the present invention will be described in detail with reference to examples.

The materials, the amounts to be used, the ratios, the treatment contents, and the treatment procedures shown in the examples described below can be appropriately changed as long as they are within the gist of the present invention. Accordingly, the scope of the present invention should not be limitatively interpreted by the specific examples described below.

Example 1

<Preparation and Evaluation of Tabular Metal Particle>
(Preparation of Tabular Metal Particle Dispersion Liquid)

13 L of ion exchange water was weighed using a reaction vessel made of NTKR-4 (manufactured by Nippon Metal Industry Co., Ltd.), 1.0 L of a 10 g/L trisodium citrate (anhydride) aqueous solution was added thereto, and the temperature was maintained to 35° C. while stirring using a chamber provided with an agitator in which four propellers made of NTKR-4 and four paddles made of NTKR-4 were attached to a shaft made of SUS316L. 0.68 L of a 8.0 g/L polystyrenesulfonic acid aqueous solution was added to the solution and 0.041 L of a sodium borohydride aqueous solution adjusted to have an amount of 23 g/L using a 0.04 N sodium hydroxide aqueous solution was further added thereto. 13 L of a 0.10 g/L silver nitrate aqueous solution was added thereto at 5.0 L/min.

1.0 L of a 10 g/L trisodium citrate (anhydride) aqueous solution and 11 L of an ion exchange water were added thereto, and 0.68 L of a 80 g/L potassium hydroquinone sulfonate aqueous solution was further added thereto. The stirring rate was increased to 800 rpm and the temperature thereof was decreased to 30° C. after 8.1 L of a 0.10 g/L silver nitrate aqueous solution was added thereto at 0.95 L/min.

8.0 L of a 44 g/L methylhydroquinone aqueous solution was added thereto and then the total amount of a gelatin aqueous solution at 40° C. described below was added thereto. The stirring rate was increased to 1200 rpm, and the total amount of a silver sulfite white precipitate mixed solution described below was added thereto.

When a change in pH of a prepared solution was stopped, 5.0 L of a 1 mol/L NaOH aqueous solution was added at 0.33 L/min. Thereafter, 0.18 L of a 2.0 g/L sodium 1-(methsulfophenyl)-5-mercaptotetrazole aqueous solution (dissolved by adjusting the pH thereof to 7.0±1.0 using NaOH and citric acid (anhydride)) was added thereto, and 0.078 L of a 70 g/L 1,2-benzisothiazolin-3-one (dissolved by adjusting the aqueous solution to be alkaline using NaOH) was added thereto. In this manner, a silver tabular particle dispersion liquid A was prepared.

(Preparation of Gelatin Aqueous Solution)

16.7 L of ion exchange water was weighed using a dissolution tank made of SUS316L. 1.4 g of alkali-treated bovine bone gelatin (GPC weight average molecular weight of 200000) on which a deionization treatment was performed was added thereto while stirring was performed using an agitator made of SUS316L at a low rate. Further, 0.91 kg of an alkali-treated bovine bone gelatin (GPC weight average molecular weight of 21000) on which a deionization treatment, a proteolytic enzyme treatment, and an oxidation treatment using hydrogen peroxide were performed was added thereto. Thereafter, the contents were completely dissolved therein by increasing the temperature thereof to 40° C. and simultaneously performing swelling and dissolving of gelatin.

(Preparation of Silver Sulfite White Precipitate Mixed Solution)

5.7 L of ion exchange water was weighed using a dissolution tank made of SUS316L, and 5.7 L of a 100 g/L silver nitrate aqueous solution was added thereto. 1.9 L of a 140 g/L sodium sulfite aqueous solution was added thereto in a short time while stirring was performed using an agitator made of SUS316L at a high rate, thereby preparing a mixed solution containing a silver sulfite white precipitate. This mixed solution was prepared immediately before use.

When a silver tabular particle dispersion liquid A was diluted with ion exchange water and spectral absorption was measured using a spectrophotometer (U-3500, manufactured by Hitachi, Ltd.), the absorption peak wavelength was 800 nm and the full width at half maximum was 250 nm.

The physical characteristics of the silver tabular particle dispersion liquid A were a pH (measured using KR5E, manufactured by AS ONE Corporation) of 9.4 at 25° C., an electrical conductivity (measured using CM-25R, manufactured by DKK-TOA Corporation) of 8.1 mS/cm, and a viscosity (measured using SV-10, manufactured by A&D company, Ltd.) of 2.1 mPa·s. The obtained silver tabular particle dispersion liquid A was accommodated in 20 L of a Union Container II type (made of low density polyethylene, distributor: AS ONE Corporation) container and stored at 30° C.

(Desalting and Redispersing of Tabular Metal Particle Dispersion Liquid)

800 g of the silver tabular particle dispersion liquid A was collected in a centrifuge tube and adjusted to have a pH of 9.2±0.2 at 25° C. using 1 mol/L of NaOH and/or 0.5 mol/L of sulfuric acid. A centrifugation operation was performed at 9000 rpm for 60 minutes by setting the temperature at 35° C. using a centrifuge (himacCR22GIII, manufactured by Hitachi Koki Co., Ltd., angle rotor R9A), and then 784 g of a supernatant was disposed. A 0.2 mM NaOH aqueous solution was added to the precipitated silver tabular particles such that the total amount was set to 400 g and the solution was stirred by hand using a stirring bar to obtain a coarse dispersion liquid. By performing the same operation as described above, 24 coarse dispersion liquids were prepared such that the total amount was set to 9600 g, added to a tank made of SUS316L, and then mixed with each other. Further, 10 cm³ of a 10 g/L solution (diluted with a mixed solution containing methanol and ion exchange water at a volume ratio of 1:1 (volume ratio)) of Pluronic 31R1 (manufactured by BASF Corporation) was added thereto. The coarse dispersion liquid mixture in the tank was subjected to a batch type dispersion treatment at 900 rpm for 120 minutes using an Auto Mixer 20 type (stirring unit was homomixer MARKII) (manufactured by PREMIX Corporation). The liquid temperature during dispersion was maintained to 50° C. After the dispersion, the temperature was decreased to 25° C. and single-pass filtration was performed using a Profile II Filter (product type: MCY1001Y030H13, manufactured by PALL Corporation).

In this manner, a silver tabular particle dispersion liquid B was prepared by performing a desalting treatment and a redispersing treatment on the silver tabular particle dispersion liquid A.

When the spectral transmittance of the silver tabular particle dispersion liquid B was measured using the same method as that of the silver tabular particle dispersion liquid A, the absorption peak wavelength and the full width at half maximum were almost the same as the results of the silver tabular particle dispersion liquid A.

The physical characteristics of the silver tabular particle dispersion liquid B were a pH of 7.6 at 25° C., an electrical conductivity of 0.37 mS/cm, and a viscosity of 1.1 mPa·s. The obtained silver tabular particle dispersion liquid A was accommodated in 20 L of a Union Container II type container and stored at 30° C.

(Evaluation of Tabular Metal Particles)

It was confirmed that tabular metal particles in a hexagonal to circular shape and a triangular shape were generated in the silver tabular particle dispersion liquid A using an image obtained by observing the silver tabular particle dispersion liquid A using TEM. Further, image analysis was performed by setting tabular metal particles in a hexagonal to circular shape as A and tabular metal particles in a triangular shape as B based on the shape of 200 tabular metal particles arbitrarily extracted from an image obtained by observing the silver tabular particle dispersion liquid A using SEM, and the proportion (number percent) of the number of tabular metal particles in a hexagonal to circular shape corresponding to A was acquired. As the result, the proportion thereof was 80 number-percent or greater with respect to the total number of tabular metal particles (tabular metal particles in a hexagonal to circular shape and tabular metal particles in a triangular shape).

The image obtained by observing the silver tabular particle dispersion liquid A using TEM was captured by image processing software ImageJ and then subjected to image processing. Image analysis related to 500 particles arbitrarily extracted from the TEM image of several fields was performed, and the equivalent circle diameter in the same area was calculated. As a result of statistical processing based on the population, the average diameter was 100 nm.

The silver tabular particle dispersion liquid A was measured using a laser diffraction and scattering type particle diameter and particle size distribution measuring device MICROTRAC MT3300II (manufactured by Nikkiso Co., Ltd., particle transmissivity was set to reflection). As the result, the average particle diameter (volume weighting) was 44 nm.

When the silver tabular particle dispersion liquid B was measured in the same manner as described above, the proportion of the tabular metal particles with respect to the total metal particles and the particle size distribution and the shape of the tabular metal particles were approximately the same as the proportion of the tabular metal particles with respect to the total metal particles in the silver tabular particle dispersion liquid A and the particle size distribution and the shape of the tabular metal particles.

The silver tabular particle dispersion liquid B was added dropwise onto a silicon substrate and dried, the thickness of each silver tabular particle was measured according to an FIB-TEM method. The measurement was performed on 10 silver tabular particles in the silver tabular particle dispersion liquid B and the average thickness was 8 nm.

<Preparation of Infrared Reflective Patterned Product>

Hereinafter, preparation of the infrared reflective patterned product will be described.

A raw material used to prepare a coating solution was suitably processed for use by diluting a purchased raw material or being made into a dispersion.

(Preparation of Coating Solution M1 for Metal Particle-Containing Pattern Layer)

—Coating Solution M1 for Metal Particle-Containing Pattern Layer—

| | |
|---|---|
| Aqueous urethane resin: HYDRAN HW 350 (manufactured by Dainippon Ink & Chemicals, Inc., solid content of 30% by mass) | 0.27 parts by mass |
| Silver tabular particle dispersion liquid B | 17.85 parts by mass |
| 1-(methylureidophenyl)-5-mercaptotetrazole (manufactured by Wako Pure Chemical Industries, Ltd., preparation of alkaline aqueous solution having solid content of 2% by mass) | 0.61 parts by mass |
| Surfactant A: LIPAL 870P (manufactured by Lion Corporation, dilution with ion exchange water having solid content of 1% by mass) | 0.96 parts by mass |

-continued

| | |
|---|---|
| Surfactant B: NAROACTY CL-95 (manufactured by Sanyo Chemical Industries, Ltd., dilution with ion exchange water having solid content, of 1% by mass) | 1.19 parts by mass |
| Methanol | 30.00 parts by mass |
| Distilled water | 49.12 parts by mass |

(Preparation of Coating Solution O1 for Overcoat Layer)
—Coating Solution O1 for Overcoat Layer—

| | |
|---|---|
| Acrylic polymer aqueous dispersion: AS-563A (manufactured by Daicel FineChem Ltd., solid content of 27.5% by mass) | 20 parts by mass |
| Crosslinking agent: CARBODILITE V-02-L2 (manufactured by Nisshinbo Chemical Inc., dilution with distilled water having solid content concentration of 20% by mass) | 0.46 parts by mass |
| Surfactant A: LIPAL 870P (manufactured by Lion Corporation, dilution with distilled water having solid content of 1% by mass) | 0.63 parts by mass |
| Surfactant B: NAROACTY CL-95 (manufactured by Sanyo Chemical Industries, Ltd., dilution with distilled water having solid content of 1% by mass) | 0.87 parts by mass |
| Urethane polymer aqueous solution: OLESTER UD350 (manufactured by Mitsui Chemicals, Inc., solid content of 38% by mass) | 0.13 parts by mass |
| Distilled water | 77.91 parts by mass |

(Preparation of Colloidal Silica Affine Particle Dispersion A)

0.10 kg of AEROSIL OX-50 (manufactured by Nippon Aerosil Corporation) serving as colloidal silica fine particles having an average primary particle diameter of 40 nm was weighed using a container made of SUS304, 0.9 kg of ion exchange water was added thereto, and coarse dispersion was performed at 3000 rpm for 60 minutes using a tabletop quick homomixer LR-1 (manufactured by MIZUHO INDUSTRIAL CO., LTD.). Next, the solution was transferred to an ultrasonic dispersion tank including an ultrasonic oscillator (model type: S-8540-12, 40 kHz, manufactured by Branson Ultrasonics, Emerson Japan, Ltd. (distributor: Branson division of Emerson in Japan)) and dispersion was carried out at a setting output of 80% for 4 hours, thereby preparing a colloidal silica fine particle dispersion A having a solid content of 10% by mass.

When measurement was performed by setting the relative refractive index set value to 140a0001 using a laser diffraction and scattering type particle diameter distribution measuring device LA-920 (manufactured by HORIBA, Ltd.), the average particle diameter was 165 nm.

(Preparation of Metal Particle-Containing Pattern Layer)

An acrylic film (TECHNOLLOY S001G, thickness of 250 μm, Tg of 103° C., manufactured by Escarbo Sheet Co., Ltd.) in a roll form serving as a support was conveyed at a speed of 15 m/min, one surface of the support was coated with the coating liquid M1 for a metal particle-containing pattern layer so as to be 10.6 cm$^3$/m$^2$ using a wire bar, a drying treatment was performed at 80° C., and then a T1 layer serving as a metal particle-containing pattern layer obtained by applying and drying the coating solution M1 was provided. The film thickness of the T1 layer after the application and the drying was 20 nm.

(Patterning Process of Metal Particle-Containing Layer—Formation of Metal Particle-Containing Pattern Layer—)

FH-6400L (manufactured by FUJIFILM Electronic Materials Co., Ltd.) serving as a positive type photosensitive resin composition was conveyed onto the prepared T1 layer at a speed of 15 m/min, the T1 layer was coated with the composition so as to be 7.0 cm$^3$/m$^2$ using a wire bar, a drying treatment was performed at 80° C., and then a T2 layer serving as a photosensitive resist layer obtained by applying and drying FH-6400L was provided.

A sample having an A4 size was cut out from the film having the T1 layer and the T2 layer on the support. Thereafter, a target mask having a predetermined pattern was brought into contact with the T2 layer side and then pattern-exposed such that the integrated light quantity was set to 50 mJ from the target mask side using ML-501D/B (manufactured by USHIO INC.). The target mask used in Example 1 was a target mask capable of forming a pattern in which the pattern portion 51 and the non-pattern portion 52, in which the length of one side of the pattern illustrated in FIG. 3 was 200 μm×200 μm, were repeated in the entire A4 size in a checkered pattern, and the shape of the pattern portion 51 matches the shape of the mask portion in this target mask.

The pattern-exposed sample was treated with 2.38% tetramethylammonium hydroxide (manufactured by Wako Pure Chemical Industries, Ltd.) for 120 seconds and then washed with distilled water for 120 seconds. The exposed portion of the T2 layer serving as a photosensitive resist layer was washed and dropped from the sample by the development process described above.

Further, this sample was continuously treated with CP48S-P2 (manufactured by Fujifilm Co., Ltd.) for 60 seconds, washed with distilled water for 60 seconds, and then sufficiently dried in a normal temperature environment. The T1 layer of the exposed portion was washed and dropped from the sample by the development process described above.

Thereafter, the entire surface of the sample including the T1 layer of a non-exposed portion and the T2 layer of a non-exposed portion on a support was exposed from the T2 layer side such that the integrated light quantity was set to 100 mJ using ML-501D/B (manufactured by USHIO INC.). Subsequently, the sample was treated with 2.38% tetramethylammonium hydroxide (manufactured by Wako Pure Chemical Industries, Ltd.) for 120 seconds and then washed with distilled water for 120 seconds. The non-exposed portion of the T2 layer serving as a photosensitive resist layer at the time of pattern exposure was washed and dropped from the sample by the development process described above. In this manner, a sample including the T1 layer of a non-exposed portion on the support was obtained.

(Preparation of Uneven Structure)

A sample having an uneven structure was prepared by applying a frame in a prism shape with a size of 50 μm to the T1 layer side of the sample having the T1 layer of the non-exposed portion on the support and performing hot pressing at 140° C. and 10 MPa using a hot press machine (mini test press MP-SNL, manufactured by TOYO SSEIKI SEISAKU-SHO, LTD.).

(Lamination of Overcoat Layer)

The T1 layer side in which the sample having the T1 layer of the non-exposed portion of the sample having this uneven structure was patterned was coated with the coating solution O1 for an overcoat layer so as to fill the uneven structure using a wire bar, a drying treatment was performed at 80° C., and then an O1 layer obtained by applying and drying the coating solution O1 was provided. The difference in refractive index between the overcoat layer and the support was 0.01.

Using such a method described above, a sample that includes an infrared reflective pattern portion containing predetermined metal particles matching the shape of a mask portion of a target mask; a non-pattern portion, and an overcoat layer formed so as to cover all the infrared reflective pattern portion and the non-pattern portion was prepared.

The obtained sample was set to an infrared reflective patterned product of Example 1. The structure of the cross section of the infrared reflective patterned product of Example 1 was schematically illustrated in FIG. 18.

Figure 17:
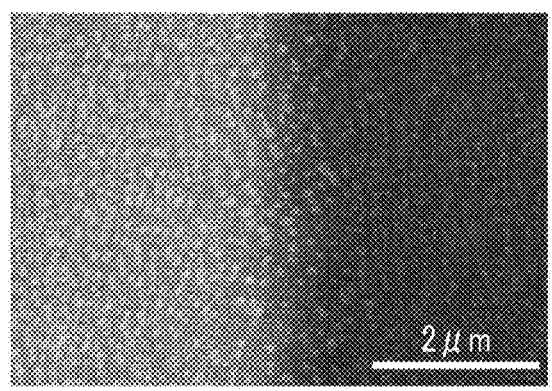
FIG. 17 is a micrograph showing the surface of a protruding portion of the uneven structure of the infrared reflective patterned product according to the present invention using a scanning electron microscope (SEM).

An SEM micrograph of a surface of a protruding portion in the uneven structure of the infrared reflective patterned product of Example 1 was shown in FIG. 17.

Example 2

An infrared reflective patterned product of Example 2 was prepared in the same manner as in Example 1 except that a frame in a prism shape with a size of 20 μm was used in place of a frame in a prism shape with a size of 50 μm in Example 1.

Example 3

An infrared reflective patterned product of Example 3 was prepared in the same manner as in Example 1 except that a frame in a pyramidal prism shape with a size of 20 μm was used in place of a frame in a prism shape with a size of 50 μm in Example 1.

Example 4

An infrared reflective patterned product of Example 4 was prepared in the same manner as in Example 1 except that a frame in a hemispherical shape with a size of 20 μm was used in place of a frame in a prism shape with a size of 50 μm in Example 1.

Example 5

An infrared reflective patterned product of Example 5 was prepared in the same manner as in Example 1 except that a frame in a corner cube shape with a size of 20 μm was used in place of a frame in a prism shape with a size of 50 μm in Example 1.

Example 6

An infrared reflective patterned product of Example 6 was prepared in the same manner as in Example 1 except that the patterning process of the metal particle-containing layer was not performed and a frame (pattern portion) in a corner cube shape, in which the length of one side thereof was 200 μm×200 μm, and a smooth frame (non-pattern portion) were repeated in a checkered pattern in place of the frame in a prism shape with a size of 50 μm in Example 1. FIG. 19 schematically illustrates the cross section structure of the infrared reflective patterned product of Example 6 by simplifying the corner cube shape.

Example 7

An infrared reflective patterned product of Example 7 was prepared in the same manner as in Example 5 except that the patterning process of the metal particle-containing layer was not performed, the overcoat layer was laminated, and an infrared absorbing material was ejected onto the overcoat layer using an ink-jet printer described below, and then the resultant was used as a non-pattern portion in Example 5. FIG. 2 schematically illustrates the cross section structure of the infrared reflective patterned product of Example 7 by simplifying the corner cube shape.

(Preparation of Non-Pattern Portion Absorbing Infrared Rays Using Ink Liquid of Infrared Absorbing Material)

A material printer was used for preparation of a non-pattern portion. Specifically, FUJIFILM Dimatrix SX-3 head (piezo-driven drop-on-demand ink-jet head (10 pL type) with 128 nozzles having a pitch of 508 μm) was used as a material printer "DMP-5005" (manufactured by FUJI-FILM Dimatrix Inc. in United States). Further, a printer formed by attaching a metal halide type UV irradiation device thereto so that shuttle scan was able to be carried out in an arbitrary shuttle pattern having multipath in control software was used.

In pattern formation, an ink liquid J1 was added to a print head and ejected in the form of a wiring pattern described below, and UV was radiated at the same time.

As the pattern used in Example 7, a pattern repeated in the entire A4 size in a checkered pattern, in which the length of one side of the pattern illustrated in FIG. 3 was 200 μm×200 μm, was formed.

This pattern is a pattern which includes the infrared reflective pattern portion 51 which does not eject the ink liquid J1 and whose T1 for a metal particle-containing pattern layer was exposed and the non-pattern portion 52 which ejects the ink liquid J1 onto T1 for a metal particle-containing pattern layer and in which an infrared absorbing material absorbs infrared rays overlapping each other.

The pattern was completed by setting the number of paths as m according to a multipath method and performing shuttle scan on a swath drawing at a resolution of m x 50 dpi. Further, the pattern was formed n times on the same place.

The thickness of the non-pattern portion 52 in which the infrared absorbing material absorbs infrared rays overlapping each other was 2.5 μm.

(Preparation of Ink Liquid J1 for Non-Pattern Portion Absorbing Infrared Rays)

—Diimmonium-Containing Infrared Absorbing Layer Ink Liquid

| | |
|---|---|
| Methyl ethyl ketone | 20 parts by mass |
| Toluene | 20 parts by mass |
| Acrylic resin (LP-45M, manufactured by Soken Chemical & Engineering Co., Ltd.) | 50 parts by mass |
| Diimmonium-based organic pigment (N,N,N,N-tetrakis(para-dibutylaminophenyl) 1,4-benzeneiminium ditetraoxychlorate; KAYASORB IRG-023, manufactured by Nippon Kayaku Co., Ltd.) | 5 parts by mass |
| Ultraviolet absorbing agent: 2-(2'hydroxy-5'-t-octylphenyl)benzotriazole (KEMISORB79, manufactured by Chemipro Kasei Kaisha, Ltd.) | 5 parts by mass |

Example 8

An infrared reflective patterned product of Example 8 was prepared in the same manner as in Example 7 except that an ink liquid J2 for a non-pattern disturbing the arrangement of tabular metal particles was used in place of the ink liquid J1 for a non-pattern portion absorbing infrared rays in Example 7. FIG. 1 schematically illustrates the cross section structure of the infrared reflective patterned product of Example 8 by simplifying the corner cube shape.

In addition, the structure of the non-pattern portion absorbing infrared rays in Example 8 was described as "randomly arranged tabular metal particles".

(Preparation of Ink Liquid J2 for Non-Pattern Disturbing Arrangement of Tabular Metal Particles)

| | |
|---|---|
| Ion exchange water | 99 parts by mass |
| Alkali-treated bovine bone gelatin (GPC weight average molecular weight of 200000) on which a deionization treatment was performed | 1 part by mass |

The ink liquid J2 was obtained by increasing the temperature to 40° C. and simultaneously performing swelling and dissolving of gelatin so that the contents were completely dissolved therein.

Example 9

An infrared reflective patterned product of Example 9 was prepared in the same manner as in Example 5 except that the overcoat layer was not laminated in Example 5.

Example 10

An infrared reflective patterned product of Example 10 was prepared in the same manner as in Example 5 except that a frame in a corner cube shape with a size of 5 μm was used in place of a frame in a corner cube shape with a size of 20 μm in Example 5.

Example 11

An infrared reflective patterned product of Example 11 was prepared in the same manner as in Example 5 except that a frame in a corner cube shape with a size of 50 μm was used in place of a frame in a corner cube shape with a size of 20 μm in Example 5.

Example 12

An infrared reflective patterned product of Example 12 was prepared in the same manner as in Example 5 except that a frame in a corner cube shape with a size of 90 μm was used in place of a frame in a corner cube shape with a size of 20 μm in Example 5.

Example 13

An infrared reflective patterned product of Example 13 was prepared in the same manner as in Example 5 except that a frame in a corner cube shape with a size of 120 μm was used in place of a frame in a corner cube shape with a size of 20 μm in Example 5.

Example 14

An infrared reflective patterned product of Example 14 was prepared in the same manner as in Example 5 except that the following coating solution M2 was used in place of the coating solution M1 for a metal particle-containing pattern layer in Example 5.
(Preparation of Coating Solution M2 for Metal Particle-Containing Pattern Layer)
—Coating Solution M2 for Metal Particle-Containing Pattern Layer—

| | |
|---|---|
| Aqueous urethane resin: HYDRAN HW 350 (manufactured by Dainippon Ink & Chemicals, Inc., solid content of 30% by mass) | 1.2 parts by mass |
| Silver tabular particle dispersion liquid B | 26.85 parts by mass |
| 1-(methylureidophenyl)-5-mercaptotetrazole (manufactured by Wako Pure Chemical Industries, Ltd., preparation of alkaline aqueous solution having solid content of 2% by mass) | 0.61 parts by mass |
| Surfactant A: LIPAL 870P (manufactured by Lion Corporation, dilution with ion exchange water having solid content of 1% by mass) | 0.96 parts by mass |
| Surfactant B: NAROACTY CL-95 (manufactured by Sanyo Chemical Industries, Ltd., dilution with ion exchange water having solid content of 1% by mass) | 1.19 parts by mass |
| Methanol | 30.00 parts by mass |
| Distilled water | 40.12 parts by mass |

Example 15

An infrared reflective patterned product of Example 15 was prepared in the same manner as in Example 5 except that the following coating solution M3 for a metal particle-containing pattern layer was used in place of the coating solution M1 for a metal particle-containing pattern layer in Example 5.
(Preparation of Coating Solution M3 for Metal Particle-Containing Pattern Layer)
—Coating Solution M3 for Metal Particle-Containing Pattern Layer—

| | |
|---|---|
| Aqueous urethane resin: HYDRAN HW 350 (manufactured by Dainippon Ink & Chemicals, Inc., solid content of 30% by mass) | 2.3 parts by mass |
| Silver tabular particle dispersion liquid B | 26.85 parts by mass |
| 1-(methylureidophenyl)-5-mercaptotetrazole (manufactured by Wako Pure Chemical Industries, Ltd., preparation of alkaline aqueous solution having solid content of 2% by mass) | 0.61 parts by mass |
| Surfactant A: LIPAL 870P (manufactured by Lion Corporation, dilution with ion exchange water having solid content of 1% by mass) | 0.96 parts by mass |
| Surfactant B: NAROACTY CL-95 (manufactured by Sanyo Chemical Industries, Ltd., dilution with ion exchange water having solid content of 1% by mass) | 1.19 parts by mass |
| Methanol | 30.00 parts by mass |
| Distilled water | 40.12 parts by mass |

Comparative Example 1

Only lamination of the T1 layer and O1 layer was performed without performing the patterning process on the metal particle-containing layer in Example 1. The obtained infrared reflective patterned product was set as an infrared reflective patterned product of Comparative Example 1.

Comparative Example 2

An infrared reflective patterned product of Comparative Example 2 was prepared in the same manner as in Example 1 except that a silver film was formed by a sputtering method in place of the metal particle-containing pattern layer was prepared in Example 1.

Comparative Example 3

An infrared reflective patterned product of Comparative Example 3 was prepared in the same manner as in Example 7 except that a silver film was formed as in JP5583988 in place of the metal particle-containing pattern layer was prepared in Example 7.

Comparative Example 4

An infrared reflective patterned product of Comparative Example 4 was prepared in the same manner as in Example 1 except that a silver film was formed by a sputtering method in place of the metal particle-containing pattern layer and a retroreflective material (Art Bright Color, manufactured by Komatsu Process Corporation) to which glass beads having an average particle diameter of 6 m and a refractive index of 2.2 were printed on the silver film in a pattern in which the pattern portion 51 and the non-pattern portion 52, in which the length of one side of the pattern illustrated in FIG. 3 was 200 μm×200 μm, were repeated in the entire A4 size in a checkered pattern using a gravure method as in the description in JP2008-268585A in place of the metal particle-containing pattern layer and the uneven structure in Example 1.

[Evaluation]

<Evaluation of Plane Orientation of Metal Particles>

—Particle Inclination Angle—

After the infrared reflective patterned product was subjected to an embedding treatment using an epoxy resin and cleaved with a razor in a state of being frozen by liquid nitrogen, and a cross section sample of the infrared reflective patterned product in the vertical direction was prepared. This cross section sample in vertical direction was observed using a scanning electron microscope (SEM) and the angle between a principal surface of the tabular metal particle of the infrared reflective pattern portion and a surface of the uneven structure closest to the tabular metal particle was acquired with respect to 100 tabular metal particles.

With infrared reflective patterned products prepared in Examples 1 to 15 and Comparative Example 1, the proportion (number percent) of the tabular metal particles which are plane-oriented so that an angle between a principal plane of the tabular metal particle of the infrared reflective pattern portion and a surface of the uneven structure closest to the tabular metal particle was in a range of 0° to ±30° with respect to all tabular metal particles was acquired.

Meanwhile, since the metal particles in the sample of Comparative Example 2 were not tabular, the plane orientation was not able to be evaluated. Since the silver films of Comparative Examples 3 and 4 were produced by a sputtering method, the plane orientation was not able to be evaluated.

The obtained results were listed in the columns of *1 of the following Table 1.

<Wavelength a Showing Highest Reflectance in Infrared Region of 780 nm to 2500 nm, Oblique Reflectance of Infrared Reflective Pattern Portion, and Oblique Reflectance of Non-Pattern Portion>

(Method of Forming Non-Pattern Portion for Comparative Measurement)

In the infrared reflective patterned product of each example and each comparative example, the reflectance was measured by eliminating the pattern portion and preparing an infrared reflective patterned product (referred to as a comparative sample) provided with only a non-pattern portion without directly measuring the oblique reflectance of the non-pattern portion in the following wavelength A.

(Calculation of Wavelength A Showing Highest Reflectance in Infrared Region of 780 nm to 2500 nm)

Figure 5:
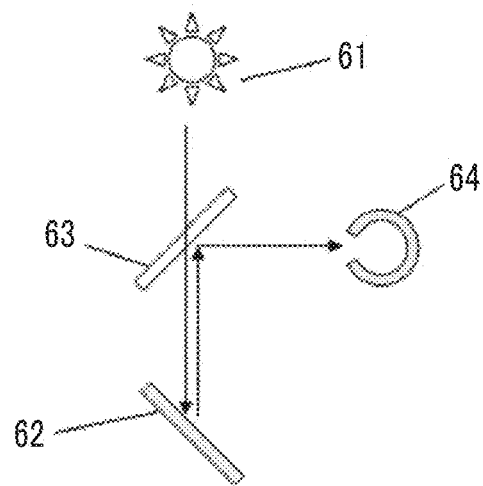
FIG. 5 is a view schematically illustrating a method of measuring the oblique reflectance of the infrared reflective patterned product.

Samples of infrared reflective patterned products of each example prepared in a checkered pattern including the pattern portion and the non-pattern portion, in which the length of one side was set to 200 μm×200 μm, repeated in a checkered pattern as illustrated in FIG. 3 and comparative samples of each example including only the non-pattern portion were cut out in a size of 5 cm². As illustrated in FIG. 5, a sample 62 was inclined at 45° with respect to light radiated from a light source 61, retroreflected light was bent by a half mirror 63 and put into a photodetector 64, and the oblique reflection spectrum of each sample was measured at an interval of 5 nm in a wavelength region of 300 nm to 2500 nm using an ultraviolet visible near infrared spectrometer (V-670, manufactured by JASCO Corporation, using integrating sphere unit ISN-723). In Examples 1 and 2, the arrangement was made such that the light source 61 was placed on the surface perpendicular to the line of a groove in a prism shape. Further, in Example 3, the arrangement was made such that the light source 61 was placed on the surface perpendicular to the line of one groove in a pyramidal prism shape. The "wavelength A with the highest reflectance in a wavelength region of 780 nm to 2500 nm", the oblique reflectance (45° reflectance) of the infrared reflective pattern portion of an infrared reflective pattern sample at a wavelength A of each example and each comparative example, and the oblique reflectance (45° reflectance) of an infrared reflective pattern comparative sample at a wavelength A of each example and each comparative example were acquired.

Moreover, in addition to each oblique reflectance, the oblique reflectance of the infrared reflective pattern portion at a wavelength A and the oblique reflectance of the non-pattern portion at a wavelength A were calculated.

The obtained results were listed in the following Table 1.

<Transmittance at 550 nm>

Samples of each example were cut out from the infrared reflective patterned products in a size of 5 cm. The transmission spectrum was measured at an interval of 5 nm in a wavelength region of 300 nm to 2500 nm using an ultraviolet visible near infrared spectrometer (V-670, manufactured by JASCO Corporation, using integrating sphere unit ISN-723), and the transmittance at 550 nm was calculated.

The obtained results were listed in the following Table 1.

<Measurement of Haze>

The haze (%) of each sample of the infrared reflective patterned product of each example and each comparative example was measured using a haze meter (NDH-5000, manufactured by NIPPON DENSHOKU INDUSTRIES Co., Ltd.).

The obtained results were listed in the following Table 1.

TABLE 1

| | Uneven structure of infrared reflective pattern portion | *1 | Presence or absence of overcoat layer | Size of uneven structure | Structure of non-pattern portion | Wavelength A (nm) showing highest reflectance in infrared region of 780 nm to 2500 nm in infrared reflective pattern portion | Oblique reflectance (%) of infrared reflective pattern portion at wavelength A | Oblique reflectance (%) of non-pattern portion at wavelength A | Oblique reflectance of infrared reflective pattern portion at wavelength A/oblique reflectance of non-pattern portion at wavelength A | Transmittance (%) at 550 nm | Haze (%) |
|---|---|---|---|---|---|---|---|---|---|---|---|
| Example 1 | Prism | 97 | Present | 50 μm | Aborbing infrared rays and not including reflective material (infrared ray transmission type) | 860 | 22 | 1 | 22.0 | 83 | 2.9 |

TABLE 1-continued

| | Uneven structure of infrared reflective pattern portion | *1 | Presence or absence of overcoat layer | Size of uneven structure | Structure of non-pattern portion | Wavelength A (nm) showing highest reflectance in infrared region of 780 nm to 2500 nm in infrared reflective pattern portion | Oblique reflectance (%) of infrared reflective pattern portion at wavelength A | Oblique reflectance (%) of non-pattern portion at wavelength A | Oblique reflectance of infrared reflective pattern portion at wavelength A/oblique reflectance of non-pattern portion at wavelength A | Transmittance (%) at 550 nm | Haze (%) |
|---|---|---|---|---|---|---|---|---|---|---|---|
| Example 2 | Prism | 97 | Present | 20 μm | Aborbing infrared rays and not including reflective material (infrared ray transmission type) | 860 | 21 | 1 | 21.0 | 83 | 2.4 |
| Example 3 | Pyramidal prism | 96 | Present | 20 μm | Aborbing infrared rays and not including reflective material (infrared ray transmission type) | 860 | 19 | 1 | 19.0 | 83 | 2.5 |
| Example 4 | Hemisphere | 95 | Present | 20 μm | Aborbing infrared rays and not including reflective material (infrared ray transmission type) | 860 | 6 | 1 | 6.0 | 84 | 2.7 |
| Example 5 | Corner cube | 97 | Present | 20 μm | Aborbing infrared rays and not including reflective material (infrared ray transmission type) | 860 | 22 | 1 | 22.0 | 84 | 2.1 |
| Example 6 | Corner cube | 97 | Present | 20 μm | Smooth AgND (infrared ray specular reflection type) | 860 | 21 | 2 | 10.5 | 78 | 3.5 |
| Example 7 | Corner cube | 97 | Present | 20 μm | Diimmonium (infrared ray absorption type) | 860 | 21 | 1 | 21.0 | 76 | 3.2 |
| Example 8 | Corner cube | 97 | Present | 20 μm | Random AgND (infrared absorption type) | 860 | 22 | 4 | 5.5 | 77 | 4.3 |
| Example 9 | Corner cube | 97 | Absent | 20 μm | Aborbing infrared rays and not including reflective material (infrared ray transmission type) | 810 | 30 | 1 | 30.0 | 81 | 90 |
| Example 10 | Corner cube | 97 | Present | 5 μm | Aborbing infrared rays and not including reflective material (infrared ray transmission type) | 860 | 18 | 1 | 18.0 | 84 | 1.9 |
| Example 11 | Corner cube | 97 | Present | 50 μm | Aborbing infrared rays and not including reflective material (infrared ray transmission type) | 860 | 22 | 1 | 22.0 | 84 | 3.1 |
| Example 12 | Corner cube | 97 | Present | 90 μm | Aborbing infrared rays and not including reflective material (infrared ray transmission type) | 860 | 21 | 1 | 21.0 | 83 | 4.5 |
| Example 13 | Corner cube | 97 | Present | 120 μm | Aborbing infrared rays and not including reflective material (infrared ray transmission type) | 860 | 21 | 1 | 21.0 | 84 | 5.6 |

In Table 1, *1 indicates tabular metal particles (with respect to all tabular metal particles, number percent) which are plane-oriented so that an angle between a principal plane of the tabular metal particle of the infrared reflective pattern portion and a surface of the uneven structure closest to the tabular metal particle is in a range of 0° to ±30°.

From Table 1, it was understood that the ratio of the reflectance of the infrared reflective pattern portion at a wavelength with the highest reflectance in an infrared region of 780 nm to 2500 nm to the reflectance of the non-pattern portion was large in the case where the infrared reflective pattern portion was obliquely irradiated with infrared rays.

In addition, the infrared reflective patterned product of Comparative Example 1 which did not include the non-pattern portion did not function as an infrared reflective patterned product because the non-pattern portion was not available.

In the infrared reflective patterned products of Comparative Examples 2 to 4 in which tabular metal particles were not used for the infrared reflective pattern portion, it was understood that the ratio of the reflectance of the infrared reflective pattern portion at a wavelength with the highest reflectance in an infrared region of 780 nm to 2500 nm to the reflectance of the non-pattern portion was small in the case where the infrared reflective pattern portion was obliquely irradiated with infrared rays.

In addition, in the infrared reflective patterned products of Comparative Examples 2 to 4 for which a vapor deposited film was used, it was assumed that the reason why the ratio of the reflectance of the infrared reflective pattern portion at a wavelength with the highest reflectance in an infrared region of 780 nm to 2500 nm to the reflectance of the non-pattern portion was small in the case where the infrared reflective pattern portion was obliquely irradiated with infrared rays was that the formability was degraded when a vapor deposited film was provided and thus the vapor deposited film was not able to follow the uneven structure. Particularly, in a case where the size of the uneven structure is decreased in order to form a fine pattern, the formability is significantly degraded when a vapor deposited film is provided and thus the vapor deposited film becomes unable to follow the uneven structure. Further, in the infrared reflective patterned product for which a vapor deposited film is used, the interlayer peeling of peeling a vapor deposited film from the support easily occurs. Further, when a dielectric multilayer film or an alternate multilayer film of a metal film and a silver film is used as an infrared reflective material, interlayer peeling easily occurs.

Moreover, in the preferred embodiments of the infrared reflective patterned product of the present invention, it was understood that transparency was high in a visible region.

In the preferred embodiments of the infrared reflective patterned products obtained in Examples 1 to 8 and 10 to 15 among the infrared reflective patterned products of the present invention, since the uneven structure was filled with the overcoat layer, the infrared reflective pattern portion had a low haze and was extremely inconspicuous in a visible region particularly compared to a case where glass beads were used for the uneven structure of Comparative Example 4.

Further, a micrograph of the shape of 200 tabular metal particles arbitrarily extracted from the image obtained by observing the surfaces of protruding portions in the uneven structure of the infrared reflective material using SEM was observed. Further, the image obtained by observing the protruding portions in the uneven portion of the infrared reflective material using TEM was captured by image processing software ImageJ and then subjected to image processing, and then image analysis related to 500 particles arbitrarily extracted from the TEM image of several fields was performed. As the result, in a case where an infrared reflective material was formed using the silver tabular particle dispersion liquid B, the proportion of the tabular metal particles on at least one surface from among the protruding portions and recessed portions of the uneven structure with respect to the total metal particles and the particle size distribution and the shape of the tabular metal particles were approximately the same as the proportion of the tabular metal particles with respect to the total metal particles in the silver tabular particle dispersion liquid B and the particle size distribution and the shape of the tabular metal particles.

INDUSTRIAL APPLICABILITY

As described above in detail, in the infrared reflective patterned product of the present invention used as a sheet to be mounted on the front surface of a display on which an infrared reflective pattern which can be applied to a data input system of performing handwriting directly on the screen of a display device is formed, an image close to a display screen can be obtained by reading the infrared reflective pattern using an input terminal capable of detecting and irradiating with infrared rays without concerning the infrared reflective pattern when used, even in an infrared reflective pattern printed transparent sheet which becomes possible to provide information related to the position of the input terminal on the transparent sheet. Therefore, the infrared reflective patterned product which can be easily used and has high practical performance can be applied to various portable terminals such as cellular phones and PDA and various information processing devices such as personal computers, television phones, televisions having a mutual communication function, and Internet terminals.

Further, according to the preferred embodiments of the infrared reflective patterned product of the present invention, for example, since the infrared reflective pattern which is extremely inconspicuous in a visible region can be obtained, when the infrared reflective patterned product is used for an information medium having an authenticity determination system of ID cards, this is advantageous from the viewpoints of prevention of crimes because the infrared reflective pattern portion is inconspicuous and an increase in design freedom of cards.

EXPLANATION OF REFERENCES

1: metal particle-containing layer
5: overcoat layer
7: infrared absorbing material
11: tabular metal particle (infrared reflective material)
40: support (base material)
51: infrared reflective pattern portion
52: non-pattern portion
53: length of one side of infrared reflective pattern portion
61: light source
62: sample
63: half mirror
64: photodetector
100: infrared reflective patterned product
105: display device
106: pen type input terminal
107: read data processing device
108: code
a: (average) thickness of metal particles
D: (average) particle diameter or (average) equivalent circle diameter of metal particles
f: area where tabular metal particles are present in depth direction
P: pitch
R: size of protruding portion or recessed portion

What is claimed is:

1. An infrared reflective patterned product comprising:
an infrared reflective pattern portion which includes an infrared reflective material in a region constituting at least a part of a support,
wherein the infrared reflective pattern portion has an uneven structure that includes a plurality of protruding portions or recessed portions,
at least one type of metal particles are contained on at least one surface from among the protruding portions or recessed portions of the uneven structure of the infrared reflective pattern portion,
the metal particles include 60 number-percent or greater of tabular metal particles in a hexagonal shape or a circular shape, and
the tabular metal particles which are plane-oriented so that an angle between a principal plane of the tabular metal particle and a surface of the uneven structure closest to the tabular metal particle is in a range of 0° to ±30° are adjusted to be 50 number-percent or greater of all tabular metal particles.

2. The infrared reflective patterned product according to claim 1, further comprising:
an overcoat layer which fills the uneven structure on a surface side provided with the infrared reflective pattern portion on the support.

3. The infrared reflective patterned product according to claim 2,
wherein a difference in refractive index between the overcoat layer and the support is 0.05 or less.

4. The infrared reflective patterned product according to claim 2,
wherein the support and the overcoat layer are transparent.

5. The infrared reflective patterned product according to claim 1,
wherein the uneven structure is in a prism shape, a pyramidal prism shape, a hemispherical shape, or a corner cube shape.

6. The infrared reflective patterned product according to claim 1,
wherein the size of the uneven structure is in a range of 1 μm to 100 μm.

7. The infrared reflective patterned product according to claim 1,
wherein the infrared reflective pattern portion in an infrared region of 780 nm to 2500 nm has a maximum reflectance of 20% or greater.

8. The infrared reflective patterned product according to claim 1,
wherein the infrared reflective patterned product has a transmittance at 550 nm of 60% or greater.

9. The infrared reflective patterned product according to claim 1,
wherein a wavelength with a highest reflectance in an infrared region of 780 nm to 2500 nm is present in a band of 780 nm to 1100 nm.

10. The infrared reflective patterned product according to claim 1 which is a sheet to be mounted on a surface or a front of a display device capable of displaying an image.

* * * * *